US012573769B2

(12) United States Patent
Matsunaga

(10) Patent No.: US 12,573,769 B2
(45) Date of Patent: Mar. 10, 2026

(54) ANTENNA DEVICE

(71) Applicant: YOKOWO CO., LTD., Tokyo (JP)

(72) Inventor: Kazuya Matsunaga, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 209 days.

(21) Appl. No.: 18/266,289

(22) PCT Filed: Dec. 10, 2021

(86) PCT No.: PCT/JP2021/045671
§ 371 (c)(1),
(2) Date: Jun. 9, 2023

(87) PCT Pub. No.: WO2022/124408
PCT Pub. Date: Jun. 16, 2022

(65) Prior Publication Data

US 2024/0030624 A1 Jan. 25, 2024

Related U.S. Application Data

(60) Provisional application No. 63/124,327, filed on Dec. 11, 2020.

(51) Int. Cl.
*H01Q 21/28* (2006.01)
*H01Q 5/378* (2015.01)
*H01Q 9/42* (2006.01)

(52) U.S. Cl.
CPC ............. *H01Q 21/28* (2013.01); *H01Q 5/378* (2015.01); *H01Q 9/42* (2013.01)

(58) Field of Classification Search
None
See application file for complete search history.

(56) References Cited

U.S. PATENT DOCUMENTS

| | | | | |
|---|---|---|---|---|
| 6,734,825 | B1 | 5/2004 | Guo et al. | |
| 2007/0057849 | A1 | 3/2007 | Moon et al. | |
| 2013/0135150 | A1* | 5/2013 | Kenoun | H01Q 9/0421 343/700 MS |
| 2018/0367791 | A1* | 12/2018 | Roe | H01Q 5/385 |

(Continued)

FOREIGN PATENT DOCUMENTS

| | | | |
|---|---|---|---|
| CN | 111628298 | A | 9/2020 |
| JP | 2007-082170 | A | 3/2007 |

(Continued)

OTHER PUBLICATIONS

Partial European Search Report issued on Nov. 6, 2024, in corresponding European patent Application No. 21903504.5, 15 pages.

(Continued)

*Primary Examiner* — Anh Q Tran
(74) *Attorney, Agent, or Firm* — XSENSUS LLP

(57) ABSTRACT

[OBJECT] To implement an antenna device capable of supporting radio waves in a wide frequency band.
[SOLUTION] An antenna device includes: a first element; a second element capacitively coupled to the first element; and a base portion coupled to the first element and the second element, wherein the first element supports, with the second element, radio waves at least in a first frequency band.

17 Claims, 19 Drawing Sheets

(56) References Cited

U.S. PATENT DOCUMENTS

| | | | | |
|---|---|---|---|---|
| 2020/0006850 | A1 | 1/2020 | Filatov | |
| 2020/0058989 | A1* | 2/2020 | Eslami | H04L 7/027 |

FOREIGN PATENT DOCUMENTS

| | | | | |
|---|---|---|---|---|
| JP | 2010081500 | A | * | 4/2010 |
| JP | 2012-138678 | A | | 7/2012 |

OTHER PUBLICATIONS

International Search Report and Written Opinion mailed on Feb. 22, 2022, received for PCT Application PCT/JP2021/045671, filed on Dec. 10, 2021, 8 pages including English Translation.
Extended European search report issued on Feb. 10, 2025, in corresponding European patent Application No. 21903504.5, 12 pages.

* cited by examiner

ANTENNA DEVICE

CROSS-REFERENCE TO RELATED APPLICATIONS

The present application is based on PCT filing PCT/JP2021/045671, filed Dec. 10, 2021, which claims priority to U.S. Provisional Patent Application No. 63/124,327, filed Dec. 11, 2020, the entire contents of each are incorporated herein by reference.

TECHNICAL FIELD

The present disclosure relates to an antenna device.

BACKGROUND ART

PTL 1 discloses an antenna device including an antenna for a low frequency band and an antenna for a high frequency band.

CITATION LIST

Patent Literature

[PTL 1] Japanese Patent Application Publication No. 2010-81500

SUMMARY OF INVENTION

Technical Problem

The low frequency band of the telephone antenna of PTL1 has a narrow bandwidth in particular, and thus it is difficult for the antenna device to support radio waves in a wide frequency band from low to high frequencies.

An example of an object of the present disclosure is to implement an antenna device capable of supporting radio waves in a wide frequency band. Other objects of the present disclosure will be apparent from the description of this specification.

Solution to Problem

An aspect of the present disclosure is an antenna device comprising: a first element; a second element capacitively coupled to the first element; and a base portion coupled to the first element and the second element, wherein the first element supports, with the second element, radio waves at least in a first frequency band.

Advantageous Effects of Invention

According to an aspect of the present disclosure, it is possible to implement an antenna device capable of supporting radio waves in a wide frequency band.

BRIEF DESCRIPTION OF DRAWINGS

FIG. 2A being a plan view of the antenna device 1A; FIG. 2B being a front view of the antenna device 1A; and FIG. 2C being a right side view of the antenna device 1A.

FIG. 4A being a circuit diagram of a high-pass filter 41; FIG. 4B being a circuit diagram of a band pass filter 42; and FIG. 4C being a circuit diagram of a band elimination filter 43.

FIG. 6A being a graph of VSWR of the antennas 10A and 10X in the low-frequency band; and FIG. 6B being a graph of isolation of the antennas 10A and 10X in the low-frequency band.

FIG. 7A being a graph of VSWR of the antennas 10A and 10X in the mid-frequency band; and FIG. 7B being a graph of isolation of the antennas 10A and 10X in the mid-frequency band.

FIG. 8A being a graph of VSWR of the antennas 10A and 10X in the high-frequency band; and FIG. 8B being a graph of isolation of the antennas 10A and 10X in the high-frequency band.

FIG. 11A being a plan view of the antenna device 1C; FIG. 11B being a front view of the antenna device 1C; and FIG. 11C being a right side view of the antenna device 1C.

FIG. 12A being an enlarged view of the front face of a first element 11C; and FIG. 12B being a view illustrating a part coupled to a second element 21C in the bottom face of a base portion 30C and the surroundings of the part.

FIG. 13A being a graph of VSWR of the antennas 10B and 10C in the low-frequency band; and FIG. 13B being a graph of radiation efficiency of the antennas 10B and 10C in the low-frequency band.

FIG. 14A being a graph of VSWR of the antennas 10B and 10C in the mid-frequency band; and FIG. 14B being a graph of radiation efficiency of the antennas 10B and 10C in the mid-frequency band.

FIG. 15A being a graph of VSWR of the antennas 10B and 10C in the high-frequency band; and FIG. 15B being a graph of radiation efficiency of the antennas 10B and 10C in the high-frequency band.

FIG. 16A being an overall perspective view of the antenna device 1D; and FIG. 16B being a perspective view of the antenna device 1D with a case 2 removed.

FIG. 17A being a graph of VSWR of the antenna 10D in the low-frequency band; and FIG. 17B being a graph of radiation efficiency of the antenna 10D in the low-frequency band.

FIG. 18A being a graph of VSWR of the antenna 10D in the mid-frequency band; and FIG. 18B being a graph of radiation efficiency of the antenna 10D in the mid-frequency band.

FIG. 19A being a graph of VSWR of the antenna 10D in the high-frequency band; and FIG. 19B being a graph of radiation efficiency of the antenna 10D in the high-frequency band.

DESCRIPTION OF EMBODIMENTS

Figure 1:
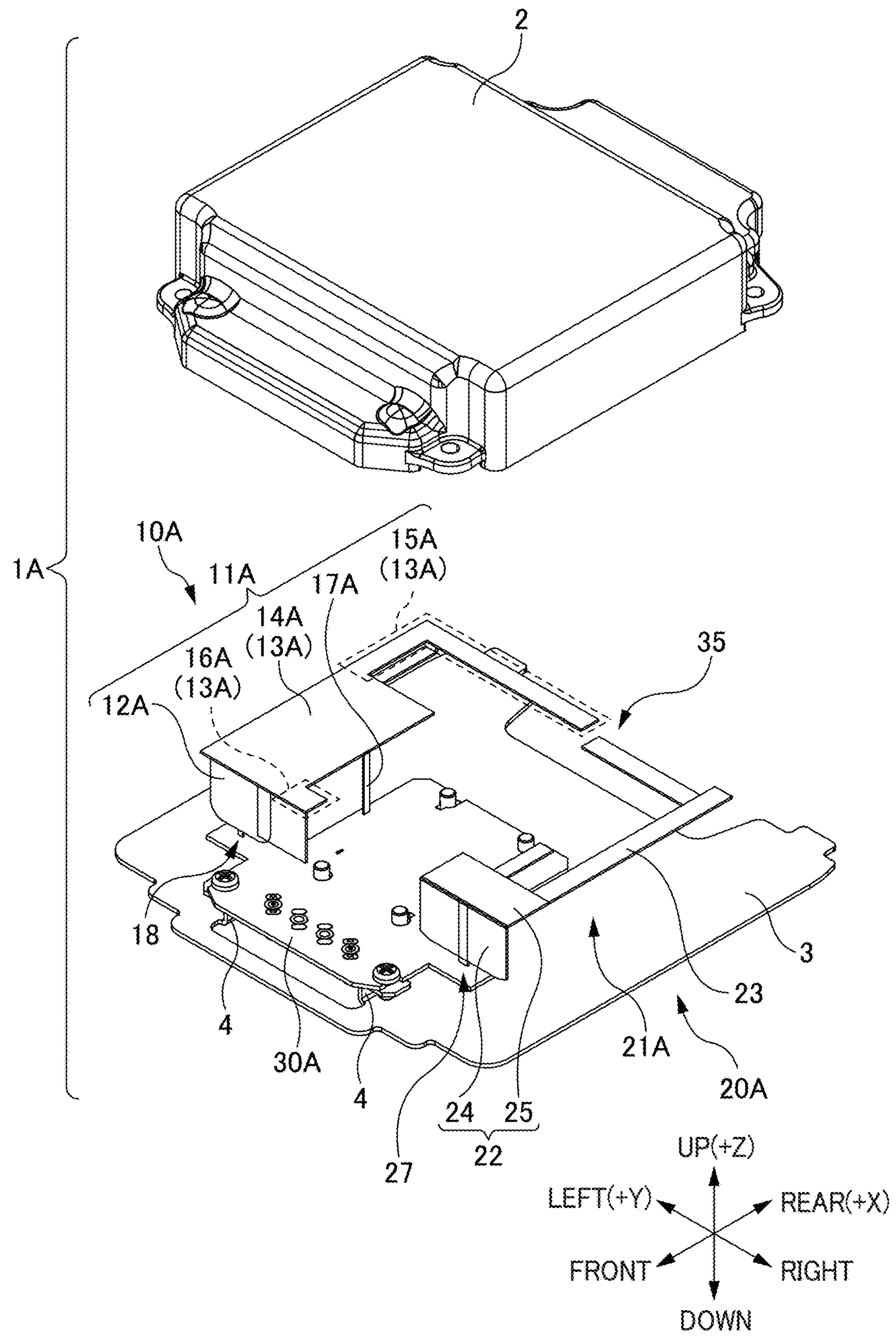
FIG. 1 is an exploded perspective view of an antenna device 1A of a first embodiment.

At least following matters will become apparent from the descriptions of the present specification and the accompanying drawings.

Hereinafter, preferred embodiments of the present disclosure will be described with reference to the drawings. Elements, members, and the like that are the same or equivalent in the drawings will be given the same reference signs, and a description thereof is omitted as appropriate.

First Embodiment

Figures 2A, 2B, 2C:
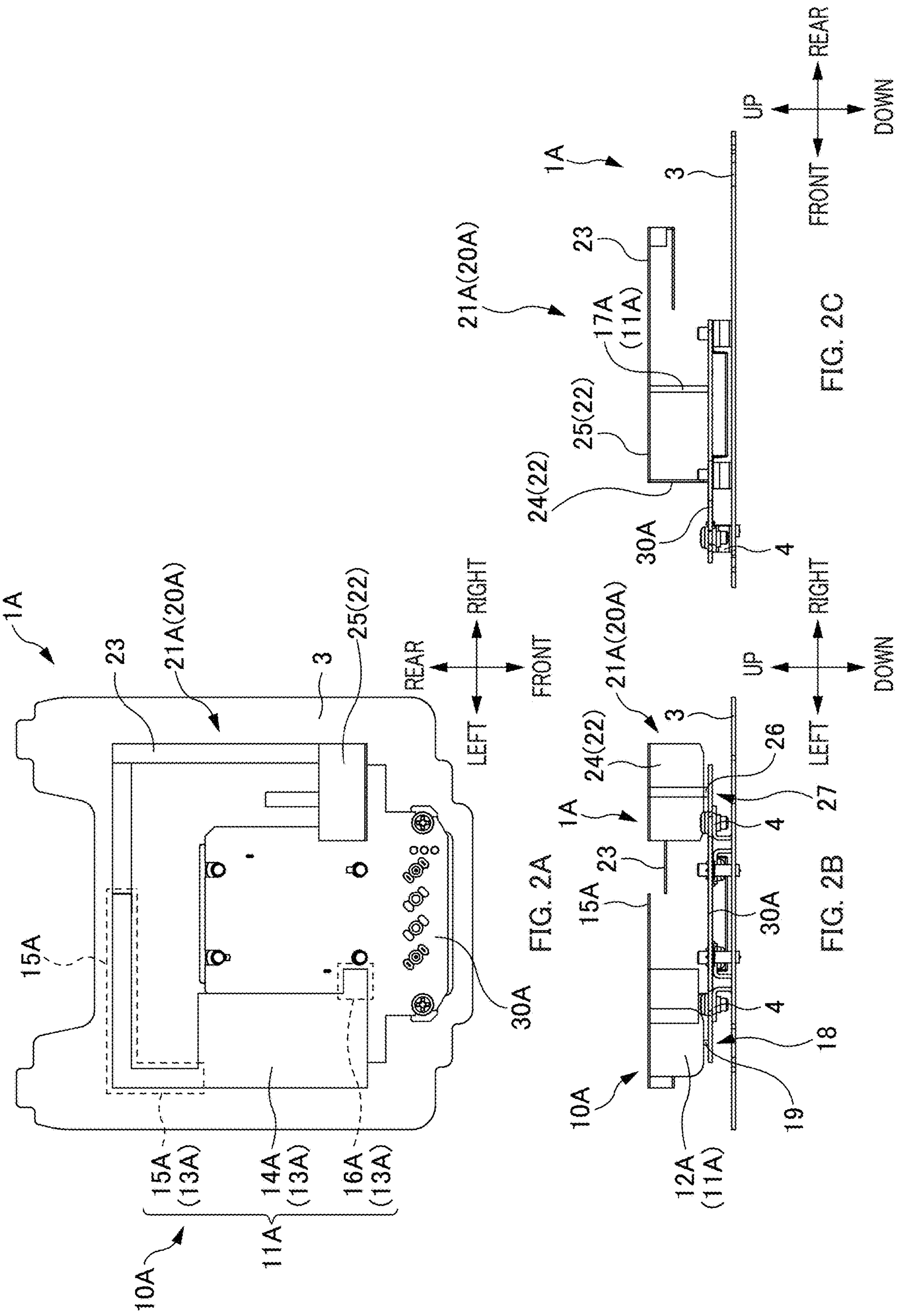
FIGS. 2A to 2C are three views illustrating the antenna device 1A of the first embodiment.

FIG. 1 is an exploded perspective view of an antenna device 1A of a first embodiment. FIGS. 2A to 2C are three views illustrating the antenna device 1A of the first embodiment. FIG. 2A is a plan view of the antenna device 1A; FIG. 2B is a front view of the antenna device 1A; and FIG. 2C is a right side view of the antenna device 1A.

FIG. 1 is an exploded perspective view of the antenna device 1A with a case 2 (described later) moved upward to illustrate the internal configuration of the antenna device 1A. FIGS. 2A to 2C do not illustrate the case 2, in the antenna device 1A.

<<Definition of Directions, Etc.>>

First, directions (left-right direction, front-rear direction, up-down direction) and the like in the antenna device 1A are defined with reference to FIG. 1.

In FIG. 1, a direction in which a first element 11A (described later) and a second element 21A (described later) are arranged is defined as a left-right direction. In FIG. 1, the direction from the second element 21A toward the first element 11A along the left-right direction is defined as the left direction; and the direction opposite thereto (from the first element 11A to the second element 21A) is defined as the right direction.

In FIG. 1, a direction in which an extending portion 13A (described later) extends from a standing portion 12A (described later) is defined as a front-rear direction. The direction from the extending portion 13A toward the standing portion 12A is defined as the front direction; and the direction opposite thereto (from the standing portion 12A toward the extending portion 13A) is defined as the rear direction.

In FIG. 1, a direction vertical to the left-right direction and the front-rear direction is defined as an up-down direction. The direction from a ground portion 3 (described later) toward the antenna 10A is defined as the up direction; and the direction opposite thereto (from the antenna 10A toward the ground portion 3) is defined as the down direction.

The front-rear direction may be referred to as X direction; the left-right direction may be referred to as Y direction; and the up-down direction may be referred to as Z direction. As illustrated in FIG. 1, the rear direction may be referred to as +X direction; the left direction may be referred to as +Y direction; and the up direction may be referred to as +Z direction. The left-right direction may be referred to as a lateral direction or a width direction, and the up-down direction is referred to as a vertical direction or a height direction.

The aforementioned definition of the directions and the like also apply to other embodiments of this specification unless otherwise specified.

<<Overview of Antenna Device 1A>>

Next, the overview of the antenna device 1A of the first embodiment is described with reference to FIGS. 1 and 2A to 2C.

The antenna device 1A is a vehicle antenna device to be used in a vehicle (not illustrated). In an embodiment according to the present disclosure, the antenna device 1A is mounted at the roof of the vehicle or inside the instrument panel of the vehicle, for example. The antenna device 1A may be positioned at any portion of the vehicle other than the roof of the vehicle or the inside of the instrument panel of the vehicle, such as a spoiler or an overhead console of the vehicle. The antenna device 1A may be an antenna device for those other than vehicles.

Figure 3:
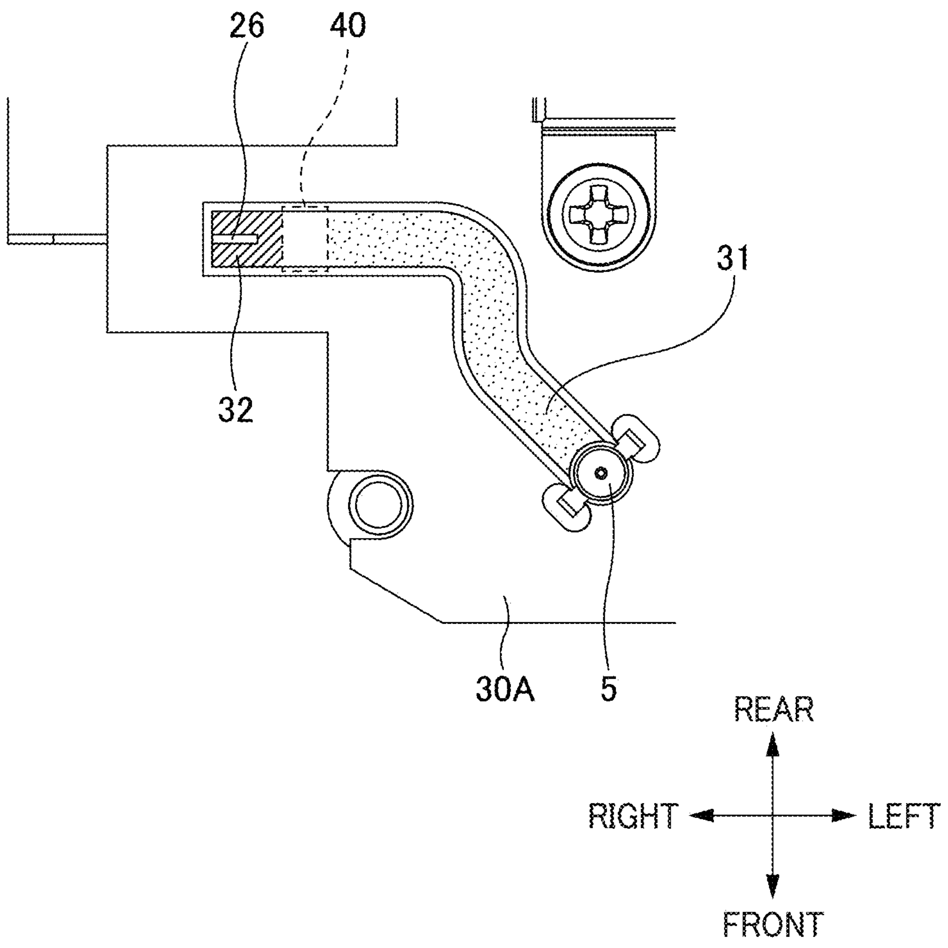
FIG. 3 is a view illustrating a part coupled to a second element 21A in the bottom face of a base portion 30A and the surroundings of the part.

The antenna device 1A includes the case 2, the ground portion 3, an antenna 10A, an antenna 20A, a base portion 30A, and a filter 40, which is illustrated in FIG. 3 and will be described later.

<Case 2>

The case 2 is a member forming the upper face of the antenna device 1A. In an embodiment of the present disclosure, the case 2 is made of insulating resin, for example. However, the case 2 may be made of another material that is other than an insulating resin material and that allows radio waves to pass therethrough. The case 2 may include a part made of insulating resin and a part made of another material allowing radio waves to pass therethrough, and may include any combination of such members.

The case 2 is fixed to the ground portion 3 with plural screws (not illustrated). However, the case 2 is not limited to being fixed with screws and may be fixed to the ground portion 3 by snap fitting, welding, adhesion, and/or the like. In this case, the antenna 10A, antenna 20A, base portion 30A, and filter 40 are arranged in a housing space defined by the case 2 forming the upper face of the antenna device 1A, and the ground portion 3 forming the bottom face of the antenna device 1A.

The case 2 may be fixed to a member other than the ground portion 3. For example, the case 2 may be fixed to a base (not illustrated) that is a member other than the ground portion 3. The base is made of insulating resin, for example. However, the base may be made of another material that is other than an insulating resin material and that allows radio waves to pass therethrough. In addition, the base may include a part made of insulating resin and a part made of another material allowing radio waves to pass therethrough, and may include any combination of such members. The ground portion 3, antenna 10A, antenna 20A, base portion 30A, and filter 40 may be arranged in a housing space defined by the case 2 forming the upper face of the antenna device 1A, and the base forming the bottom face of the antenna device 1A.

<Ground Portion 3>

The ground portion 3 is a member serving as a ground for antennas (the antennas 10A and 20A herein) included in the antenna device 1A. In the embodiment of the present disclosure, the ground portion 3 serves as the ground common to the antennas 10A and 20A. However, the ground portion 3 may serve as a ground for a part of the antennas included in the antenna device 1A. For example, the ground portion 3 may serve as a ground for the antenna 10A while another ground portion may serve as a ground for the antenna 20A.

In the embodiment of the present disclosure, the ground portion 3 is formed of a single metal plate (sheet metal) as illustrated in FIGS. 1 and 2A to 2C. However, the ground portion 3 may be formed of plural different metal plates. For example, the ground portion 3 may be configured such that a metal plate at which the antenna 10A is provided and another metal plate at which the antenna 20A is provided are electrically coupled to each other.

The ground portion 3 may be formed of a member other than a plate-shaped one as long as the ground portion 3 serves as a ground for antennas included in the antenna device 1A. The ground portion 3 may include any combination of a member made of metal and a member made of a material other than metal, as long as the ground portion 3 serves as a ground for antennas included in the antenna device 1A. For example, the ground portion 3 may include a metal plate and a resin insulator. Further, the ground portion 3 may be formed of a single substrate including a printed-circuit board (PCB) with a conductor pattern formed therein.

As illustrated in FIG. 2A, the ground portion 3 is formed of a member having a substantially quadrilateral shape in plan view when viewed in the −Z direction (in the down direction). In the following description, the "substantially quadrilateral shape" refers to a shape composed of four sides, the shape including a square and a rectangle, for example. For example, the substantially quadrilateral shape may have at least one corner that is cut out obliquely relative to the corresponding sides or may have at least one corner including a curve. Furthermore, the "substantially quadrilateral shape" may include a cutout (a recessed portion) or a projection (a protruding portion) in a part of any side.

In the embodiment of the present disclosure, the ground portion 3 includes seat portions 4, which support the base portion 30A. The seat portions 4 are formed so as to protrude upward by bending a part of the ground portion 3. The base portion 30A is provided on the upper side of the seat portions 4. Accordingly, the base portion 30A is positioned above the front surface (the surface in the +Z direction) of the ground portion 3 with a predetermined distance therebetween.

Note that the base portion 30A may be supported by a holder (not-illustrated) or the case 2, for example, as long as the base portion 30A is positioned above the front surface of the ground portion 3 with a predetermined distance therebetween. In this case, the ground portion 3 does not have to include the seat portions 4. When the base portion 30A is supported by the case 2, an antenna element, such as a first element 11A, for example, which will be described later, may be fixed to the base portion 30A with solder or an M-shaped spring. The base portion 30A may be directly provided at the front surface of the ground portion 3 without the seat portions 4 provided therebetween. In other words, the base portion 30A may be positioned at the front surface of the ground portion 3 without any space therebetween.

<Antenna 10A>

The antenna 10A is a broadband antenna for mobile communication based on an inverted-F antenna. In the embodiment of the present disclosure, the antenna 10A supports radio waves in a frequency band of 699 to 5000 MHz for GSM, UMTS, LTE, and 5G, for example. However, the antenna 10A is not limited to this, and may support radio waves in a frequency band for a part (e.g., only 5G) of GSM, UMTS, LTE, and 5G.

Further, the antenna 10A may support radio waves in a frequency band other than the frequency band for GSM, UMTS, LTE, and 5G. For example, the antenna 10A may be an antenna supporting radio waves in a frequency band used for telematics, V2X (Vehicle to Everything: vehicle-to-vehicle communication, vehicle-to-road communication), Wi-Fi, Bluetooth, and/or the like. Furthermore, the antenna 10A may support MIMO (Multiple-Input Multiple-Output) communication, as will be described later.

In the following description, a predetermined range of low frequencies in the frequency band of radio waves supported by the antenna 10A may be referred to as "low-frequency band". In the embodiment of the present disclosure, the low-frequency band is in a range of 699 to 960 MHz, for example.

A predetermined range of high frequencies in the frequency band of radio waves supported by the antenna 10A may be referred to as "high-frequency band". In the embodiment of the present disclosure, the high-frequency band is in a range of 3300 to 5000 MHz, for example.

A predetermined range of frequencies between the low- and high-frequency bands in the frequency band of radio waves supported by the antenna 10A may be referred to as "mid-frequency band". In the embodiment of the present disclosure, the mid-frequency band is in a range of 1710 to 2690 MHz, for example.

As described above, the low-frequency band is a frequency band lower than the mid-frequency band. The mid-frequency band is a frequency band higher than the low-frequency band and lower than the high-frequency band. The high-frequency band is a frequency band higher than the mid-frequency band.

Note that the mid-frequency and high-frequency bands may be collectively referred to as "mid/high frequency band". The frequency values given in the aforementioned low-frequency, mid-frequency, and high-frequency bands are not limited to those values, and may be varied depending on the frequency band of radio waves supported by the antenna 10A.

The antenna 10A includes the first element 11A and a feed portion 18.

The first element 11A is an element that resonates in the frequency band (e.g., the low-frequency band and the mid/high frequency band) of radio waves supported by the antenna 10A. The first element 11A is coupled to the base portion 30A as illustrated in FIGS. 1 and 2B. Herein, the phrase "be coupled" is not limited to "be physically coupled", but includes "be electrically coupled". Accordingly, the phrase "the first element 11A is coupled to the base portion 30A" is specifically not limited to "the first element 11A is connected to the base portion 30A with a conductor", but includes "the first element 11A is connected to the base portion 30A with an electronic circuit, an electronic component, and/or the like".

The first element 11A includes the standing portion 12A, the extending portion 13A, and a short-circuit portion 17A.

The standing portion 12A is a portion of the first element 11A and is formed so as to stand against the base portion 30A. In the embodiment of the present disclosure, the standing portion 12A is formed so as to stand in the up direction against the base portion 30A. The direction in which the standing portion 12A stands against the base portion 30A is not limited to the up direction (the +Z direction), but may be inclined at a predetermined angle relative to the base portion 30A.

In the embodiment of the present disclosure, the standing portion 12A has a self-similar shape as illustrated in FIG. 2B. This can implement a wider frequency band. Herein, the self-similar shape is a shape that is similar to itself even when the scale (size ratio) changes. However, the standing portion 12A does not have to have a self-similar shape.

At the end portion of the standing portion 12A in the down direction (the −Z direction), a first element coupling portion 19 is provided as illustrated in FIG. 2B. The first element coupling portion 19 is a portion of the first element 11A and is coupled to the base portion 30A. Accordingly, the first element 11A is coupled to the base portion 30A.

The first element 11A may be coupled to the base portion 30A by screwing depending on the frequency band supported by the first element 11A. In this case, bosses for screwing are formed in the case 2, and the first element 11A is screwed to the case 2 together with the base portion 30A, thereby making it possible to both mechanically support the first element 11A and electrically couple the first element 11A and the base portion 30A. Further, in this case, the screws can act as a part of the antenna with the length of the screws being adjusted.

The extending portion 13A is a portion formed so as to extend from the standing portion 12A. The extending portion 13A is also the portion formed so as to face the ground portion 3. In the embodiment of the present disclosure, the extending portion 13A is formed so as to extend from the upper end portion of the standing portion 12A, as illustrated in FIG. 1. However, the extending portion 13A may be formed so as to extend from a part of the standing portion 12A other than the upper end portion. In other words, the extending portion 13A may be formed so as to extend from a position in the up-down direction in the standing portion 12A. Note that the direction in which the extending portion 13A extends is not limited to the direction parallel to the face of the ground portion 3, but may be a direction inclined at a predetermined angle relative to the direction parallel to the face of the ground portion 3.

The extending portion 13A includes a main portion 14A, a first additional portion 15A, and a second additional portion 16A.

The main portion 14A is a portion of the extending portion 13A and extends from the standing portion 12A. In FIGS. 1 and 2A, the main portion 14A is indicated by the region other than two regions surrounded by dashed lines (the regions corresponding to the first additional portion 15A and the second additional portion 16A).

The first additional portion 15A is a portion that extends from the main portion 14A and is positioned away from the standing portion 12A. In the embodiment of the present disclosure, the first additional portion 15A extends rearward from the rear end portion of the main portion 14A, bends to the right direction, and further extends. In FIGS. 1 and 2A, the first additional portion 15A is indicated by the region positioned on the rear side (in the +X direction) out of the two regions surrounded by the dashed lines. Herein, the phrase "the first additional portion 15A is positioned away from the standing portion 12A" means that in the positional relationship between the first additional portion 15A and the second additional portion 16A, one (the first additional portion 15A) is located more distant from the standing portion 12A than the other (the second additional portion 16A) is. In other words, the distance between the standing portion 12 and first additional portion 15A is greater than the distance between the standing portion 12 and the second additional portion 16A.

The second additional portion 16A is a portion that extends from the main portion 14A and is positioned close to the standing portion 12A. In FIGS. 1 and 2A, the second additional portion 16A is indicated by the region positioned on the front side (in the −X direction) out of the two regions surrounded by the dashed lines. Herein, the phrase "the second additional portion 16A is positioned close to the standing portion 12A" means that in the positional relationship between the first additional portion 15A and the second additional portion 16A, one (the second additional portion 16A) is located closer to the standing portion 12A than the other (the first additional portion 15A) is.

The short-circuit portion 17A is a portion that branches off from the extending portion 13A and is coupled to the base portion 30A. The short-circuit portion 17A is electrically coupled to the ground portion 3. Since the first element 11A includes the short-circuit portion 17A, it is possible to facilitate impedance matching in the frequency band of radio waves supported by the antenna 10A.

The short-circuit portion 17A may be coupled to the base portion 30A by soldering, welding, and the like, or by screwing. In this case, a boss for screwing is formed in the case 2, and the short-circuit portion 17A is screwed to the case 2 together with the base portion 30A, thereby making it possible to both mechanically support the short-circuit portion 17A and electrically couple the short-circuit portion 17A and the base portion 30A. Further, in this case, the screws can act as a part of the antenna by adjusting the length of the screw.

The antenna 10A according to the embodiment of the present disclosure mainly supports the low-frequency band with the standing portion 12A, the main portion 14A, the first additional portion 15A, and the short-circuit portion 17A. In other words, the portion constituted by the standing portion 12A, main portion 14A, first additional portion 15A, and short-circuit portion 17A in the first element 11A is formed to have a length and a width corresponding to a wavelength used in the low-frequency band (e.g., the wavelength at 699 MHz).

Further, the antenna 10A according to the embodiment of the present disclosure mainly supports the mid-frequency band with the standing portion 12A, the main portion 14A, the second additional portion 16A, and the short-circuit portion 17A. In other words, the portion constituted by the standing portion 12A, main portion 14A, second additional portion 16A, and short-circuit portion 17A in the first element 11A is formed to have a length and a width corresponding to a wavelength used in the mid-frequency band (e.g., the wavelength at 2 GHz).

Further, the antenna 10A according to the embodiment of the present disclosure mainly supports the high-frequency band mainly with the standing portion 12A. In other words, the portion constituted by the standing portion 12A in the first element 11A is formed to have a length and a width corresponding to a wavelength used in the high-frequency band (e.g., the wavelength at 5 GHz).

The feed portion 18 is a region including the feed point of the antenna 10A. In the embodiment of the present disclosure, the feed portion 18 is positioned in a portion (the first element coupling portion 19) that couples the first element 11A and the base portion 30A, as illustrated in FIG. 2B.

<Antenna 20A>

The antenna 20A is a broadband antenna for mobile communication based on a monopole antenna. In the embodiment of the present disclosure, the antenna 20A supports radio waves in a frequency band different from the frequency band of radio waves supported by the antenna 10A. The antenna 20A supports radio waves in the frequency band of 1710 to 5000 MHz for Sub-6 GHz, for example. However, the antenna 20A may support radio waves in a frequency band other than that of Sub-6 GHz. For example, the antenna 20A may be an antenna supporting radio waves in a frequency band used in telematics, V2X, Wi-Fi, Bluetooth, and/or the like.

The antenna 20A may support radio waves in the same frequency band as that of radio waves supported by the antenna 10A. In other words, the antenna 20A may support radio waves in the frequency band of 699 to 5000 MHz for GSM, UMTS, LTE, and 5G, for example. In this case, the antenna device 1A may be an antenna device for MIMO communication, for example. In MIMO communication, plural antennas individually transmit data and receive data simultaneously. The antenna device 1A that performs MIMO communication individually transmits data through the antennas 10A and 20A, which constitute the antenna device 1A, and receives data simultaneously through the antennas 10A and 20A.

The antenna 20A includes the second element 21A and a feed portion 27. The second element 21A includes an antenna portion 22 and an additional element portion 23.

The antenna portion 22 is an element that resonates in a frequency band (e.g., 1710 to 5000 MHz band for Sub-6 GHz) of radio waves supported by the antenna 20A. The antenna portion 22 is formed so as to have a length and a width corresponding to the frequency band (1710 to 5000 MHz band for Sub-6 GHz, herein) of radio waves supported by the antenna 20A.

The antenna portion 22 includes a standing portion 24 and an extending portion 25, similarly to the standing portion 12A and extending portion 13A in the aforementioned first element 11A.

The standing portion 24 is a portion of the antenna portion 22 and is formed so as to stand against the base portion 30A. In the embodiment of the present disclosure, the standing portion 24 is formed so as to stand upward against the base portion 30A. Note that the direction in which the standing portion 24 stands against the base portion 30A is not limited to the up direction (the +Z direction), but may be a direction inclined at a predetermined angle relative to the base portion 30A.

As illustrated in FIG. 2B, at the end portion of the standing portion 24 in the down direction (the −Z direction), a second element coupling portion 26 is provided. The second element coupling portion 26 is a portion of the second element 21A and is coupled to the base portion 30A. Accordingly, the second element 21A is coupled to the base portion 30A.

The extending portion 25 is a portion formed so as to extend from the standing portion 24. The extending portion 25 is also the portion formed so as to face the ground portion 3. In the embodiment of the present disclosure, the extending portion 25 is formed so as to extend from the upper end portion of the standing portion 24, as illustrated in FIGS. 1 and 2C. However, the extending portion 25 may be formed so as to extend from a part of the standing portion 24 other than the upper end portion. In other words, the extending portion 25 may be formed so as to extend from a position in the up-down direction in the standing portion 24. Note that the direction in which the extending portion 25 extends is not limited to the direction parallel to the face of the ground portion 3, but may be a direction inclined at a predetermined angle relative to the direction parallel to the ground portion 3.

The additional element portion 23 is a portion formed so as to further extend from the extending portion 25 of the antenna portion 22. The additional element portion 23 is a portion that resonates with the antenna portion 22, in the frequency band (e.g., 1710 to 5000 MHz band for Sub-6 GHz) supported by the antenna 20A. The additional element portion 23 includes a portion capacitively coupled to the first element 11A.

Specifically, the additional element portion 23 extends in the +X direction from the extending portion 25 of the antenna portion 22, as illustrated in FIGS. 1, 2A, and 2C. The additional element portion 23 then bends in the +Y direction therefrom such that the end portion of the additional element portion 23 is adjacent to the end portion of the first additional portion 15A of the extending portion 13A of the first element 11A. Accordingly, in the embodiment of the present disclosure, the additional element portion 23 is provided so as to be capacitively coupled to the end portion of the first element 11A.

Herein, when the end portion of the additional element portion 23 is adjacent to the end portion of the first element 11A, the "end portion" does not refer to an exact end, but refers to a predetermined region including the end.

In the embodiment of the present disclosure, the end portions of the additional element portion 23 and first additional portion 15A are positioned so as to overlap in the plan view illustrated in FIG. 2A, while being spaced apart from each other in the up-down direction in the front view illustrated in FIG. 2B. However, the end portions of the additional element portion 23 and first additional portion 15A are not limited to the positional relationship illustrated in FIGS. 2A and 2B.

In the embodiment of the present disclosure, the end portion of the first additional portion 15A is positioned above the end portion of the additional element portion 23, as illustrated in FIG. 2B. However, the end portion of the additional element portion 23 may be provided so as to be positioned above the end portion of the first additional portion 15A.

Further, the end portions of the additional element portion 23 and first additional portion 15A may be spaced apart from each other in the left-right direction in the plan view illustrated in FIG. 2A, for example. In this case, the end portions of the additional element portion 23 and first additional portion 15A may be at the same position or different positions in the up-down direction in the side view illustrated in FIG. 2B, for example.

Furthermore, in the embodiment of the present disclosure, the end portions of the additional element portion 23 and first additional portion 15A are at the same position in the front-rear direction as illustrated in FIG. 2A. However, the end portions thereof do not have to be at the same position in the front-rear direction, but may be at different positions in the front-rear direction. For example, the end portion of the additional element portion 23 may be positioned on the front side relative to the end portion of the first additional portion 15A, be positioned so as to at least partially overlap in the front-rear direction, or be positioned so as to be spaced apart from each other in the front-rear direction.

From the above, the end portions of the additional element portion 23 and first additional portion 15A just have to be provided adjacent to each other such that the first element 11A and second element 21A are capacitively coupled to each other.

In the antenna device 1A of the embodiment of the present disclosure, as described above, the end portions of the first and second elements 11A and 21A are positioned so as to be capacitively coupled to each other, to thereby implement a capacitive coupling portion 35.

This makes it possible to generate two resonances in the low-frequency band, with the first element 11A of the antenna 10A and the second element 21A of the antenna 20A, which includes the additional element portion 23. In other words, with superposition of the two resonances, which are the resonance of the first element 11A of the antenna 10A alone and the resonance of the antenna 10A considering capacitive coupling, it is possible to expand the band corresponding to the low-frequency band supported by the first element 11A toward the lower frequency side. Accordingly, the antenna 10A of the antenna device 1A according to the embodiment of the present disclosure can easily achieve a wider frequency band.

The feed portion 27 is a region including the feed point of the antenna 20A. In the embodiment of the present disclosure, the feed portion 27 is positioned in the portion (the second element coupling portion 26) coupling the second element 21A and the base portion 30A, as illustrated in FIG. 2B.

<Base Portion 30A>

The base portion 30A is a plate member that is coupled to the first element 11A of the antenna 10A and the second element 21A of the antenna 20A. The base portion 30A may be provided with elements, circuits, and/or the like to process signals from the antennas 10A and 20A.

In the antenna device 1A according to the embodiment of the present disclosure, the base portion 30A is a printed circuit board (PCB), for example. The base portion 30A is formed such that a conductor pattern formed in a resin material such as glass epoxy resin, for example. However, the base portion 30A may be formed such that a conductor pattern is formed in a resin material other than glass epoxy resin, such as phenol resin. Further, the base portion 30A may be a flexible substrate, for example.

The base portion 30A does not have to be entirely plate-shaped. The base portion 30A may include a part having a shape other than a plate shape. For example, the base portion 30A may be a part of the case 2 or may be a part of the holder (not illustrated) holding the first element 11A and the second element 21A described above. In this case, the case 2 and the holder (not illustrated) may be made of resin, for example.

The base portion 30A is not limited to the aforementioned configuration, but may be configured only with a conductor pattern. When the base portion 30A is configured such that a conductor pattern is formed in a resin material, the MID (Molded Interconnect Device) technology can be used, for example. This makes it possible to form a conductor pattern in a resin material having a complicated three-dimensional shape. It is also possible to form a conductor pattern, with the use of the MID technology, in a resin material having a shape as of the base portion 30A illustrated in FIGS. 1 and 2A to 2C, for example.

When the antennas 10A and 20A are arranged adjacent to each other so as to be capacitively coupled as described above as in the antenna device 1A according to the embodiment of the present disclosure, isolation between the antennas 10A and 20A may deteriorate. Specifically, when the antennas 10A and 20A are arranged adjacent to each other, the antenna 10A may be affected by signals in the frequency band supported by the antenna 20A, and vice versa. For example, signals at a frequency of radio waves supported by the antenna 10A may travel to the base portion 30A side through the feed portion 27 of the antenna 20A. Thus, the antenna 10A is affected by the antenna 20A, which is arranged adjacent to the antenna 10A, and the characteristics in the low-frequency band in the antenna 10A may deteriorate, for example.

Then, the antenna device 1A according to the embodiment of the present disclosure includes the filter 40 as will be described later, to thereby improve the isolation between the antennas 10A and 20A.

<Filter 40>

FIG. 3 is a view illustrating a part coupled to the second element 21A in the bottom face of the base portion 30A and the surroundings of the part.

The filter 40 is a circuit element to attenuate signals in a predetermined frequency band. In the embodiment of the present disclosure, the filter 40 attenuates signals in an unwanted frequency band in the frequency band of radio waves supported by the antenna 20A. In the embodiment of the present disclosure, the unwanted frequency band is the low-frequency band (699 to 960 MHz band), for example, in the frequency band of radio waves supported by the antenna 10A. The filter 40 does not have to attenuate signals throughout the low-frequency band, but may attenuate signals in a part of the low-frequency band.

In the antenna device 1A according to the embodiment of the present disclosure, as illustrated in FIG. 3, a power line (a microstrip line) formed of a conductor is provided between the second element coupling portion 26 and a feed line coupling portion 5, which is coupled to a feed line. The filter 40 is provided so as to be coupled in series to the microstrip line. Specifically, the filter 40 is provided between a first region 31 and a second region 32. Herein, the first region 31 is a conductive region on the side coupled to the feed line of the antenna device 1A in the microstrip line of the base portion 30A. The second region 32 is a conductive region on the side coupled to the second element 21A in the microstrip line of the base portion 30A.

In the embodiment of the present disclosure, as illustrated in FIG. 3, the filter 40 is provided closer to the second element coupling portion 26 (i.e., closer to the feed portion 27 of the antenna 20A) than to the feed line coupling portion 5, which is coupled to the feed line, in the microstrip line of the base portion 30A. This can reduce degradation of signals due to coupling of transmission lines in the microstrip line. However, the filter 40 may be provided closer to the feed line coupling portion 5 than to the second element coupling portion 26, when the issue of signal degradation due to coupling of the transmission lines can be tolerated.

In FIG. 3, the filter 40 is indicated as a single block by a dashed box for convenience. The filter 40 includes two circuit elements in practice, which are an inductor L and a capacitor C, as illustrated in FIGS. 4A to 4C described later.

Figure 4A:
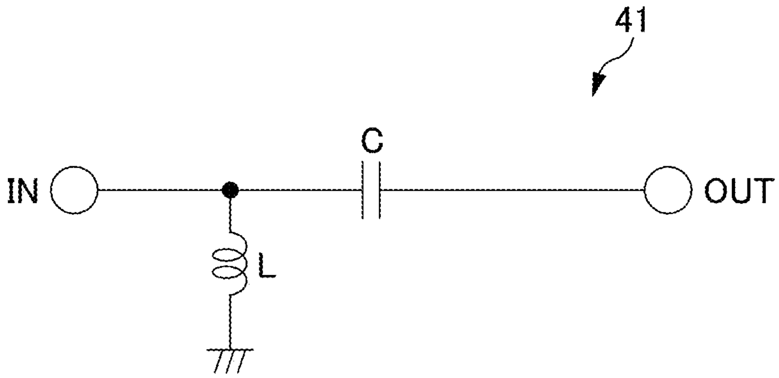
FIGS. 4A to 4C are circuit diagrams illustrating examples of a filter 40.
Figure 4B:
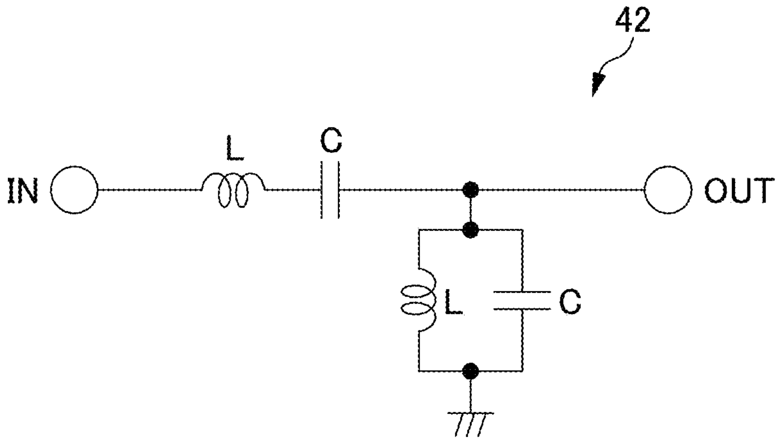
Figure 4C:
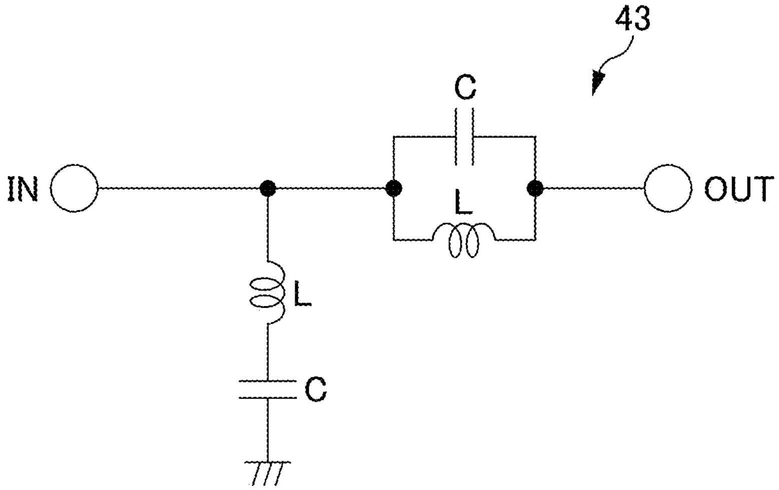

FIGS. 4A to 4C are circuit diagrams illustrating examples of the filter 40. FIG. 4A is a circuit diagram of a high-pass filter 41, FIG. 4B is a circuit diagram of a band pass filter 42, and FIG. 4C is a circuit diagram of a band elimination filter 43.

The filter 40 may be a high-pass filter (HPF) 41 as illustrated in FIG. 4A, for example. The high-pass filter 41 is a circuit element to attenuate signals in the low-frequency band and pass signals in the mid/high frequency band, for example. The high-pass filter 41 includes a capacitor C and an inductor L coupled to the ground potential as illustrated in FIG. 4A.

The filter 40 may be a band pass filter (BPF) 42 as illustrated in FIG. 4B, for example. The band pass filter 42 is a circuit element to pass only signals in a specific frequency band (the mid/high frequency band herein) and attenuate signals in other frequency bands (the low-frequency band herein). The band pass filter 42 includes an inductor L, a capacitor C, and a parallel circuit that includes an inductor L and a capacitor C and that is coupled to the ground potential as illustrated in FIG. 4B.

The filter 40 may be a band elimination filter (BEF) 43 as illustrated in FIG. 4C, for example. The band elimination filter 43 is a circuit element to attenuate signals in a specific frequency band (the low-frequency band herein) and pass signals in other frequency bands (the mid/high frequency band herein). The band elimination filter 43 includes: a series circuit that includes an inductor L and a capacitor C and that is coupled to the ground potential; and a parallel circuit that includes an inductor L and a capacitor C, as illustrated in FIG. 4C.

Each of the filters illustrated in FIGS. 4A to 4C has one terminal IN coupled to the first region 31, for example, and the other terminal OUT coupled to the second region 32, for example. As such, the filter 40 is coupled to the microstrip line in series.

As described above, the antenna device 1A according to the embodiment of the present disclosure includes the filter 40, which is configured with the high-pass filter 41, the band pass filter 42, or the band elimination filter 43, to thereby improve isolation between the antennas 10A and 20A. Although the filter 40 according to the embodiment of the present disclosure is a circuit element that attenuates signals in a predetermined frequency band, the filter 40 may be a surface acoustic wave (SAW) filter. Furthermore, the antenna device 1A does not have to include the filter 40 when the issue of isolation can be tolerated, depending on the communication standards of the antennas 10A and 20A or the level of received signals thereof.

<Other Configuration of Antenna Device 1A>

The antenna device 1A may include a holder (not-illustrated) supporting at least any one of the antenna 10A, the antenna 20A, or the base portion 30A. The holder is made of resin and is provided at the ground portion 3. However, the holder may be made of a material other than resin.

The antennas 10A and 20A may be fixed to the case 2 by screwing, welding, adhesion, snap fitting, or the like, instead of the aforementioned holder. This can improve the ease of assembly of the antenna device 1A. Furthermore, this can stabilize the distance between the end portions of the first element 11A and the second element 21A, which are positioned adjacent to each other, thereby being able to stabilize the capacitive coupling. The first element 11A of the antenna 10A and the second element 21A of the antenna 20A may have holes in order to be welded onto the case 2.

The antenna device 1A may include another antenna in addition to the antennas 10A and 20A. Such another antenna may be a planar antenna for Global Navigation Satellite Systems (GNSS), Satellite Digital Audio Radio Service (SDARS), or Electronic Toll Collection (ETC), for example.

The planar antenna for GNSS or SDARS may be a multilayer or multistage antenna, in the case where the size in the up-down direction in the antenna device 1A is not strictly limited or other cases. This enables the planar antenna to support radio waves in plural frequency bands. Furthermore, the planar antenna may support radio waves in plural frequency bands by including a radiation element with an opening, such as a slot.

Such another antenna provided in addition to the antennas 10A and 20A is not limited to aforementioned antennas, and may be an antenna supporting radio waves in a frequency band used in telematics, V2X, Wi-Fi, Bluetooth, or DAB.

<<Antenna Device 1X of Comparative Example>>

As described above, the antenna device 1A according to the embodiment of the present disclosure includes the capacitive coupling portion 35, which is implemented by the end portions of the first element 11A and the second element 21A. This allows the low-frequency band supported by the first element 11A to have a bandwidth expanded toward the lower frequency side in the antenna device 1A according to the embodiment of the present disclosure. The following description verifies the characteristics of the antenna 10A of the antenna device 1A according to the embodiment of the present disclosure using a comparative example. First, an antenna device 1X of the comparative example illustrated in FIG. 5 is described.

Figure 5:
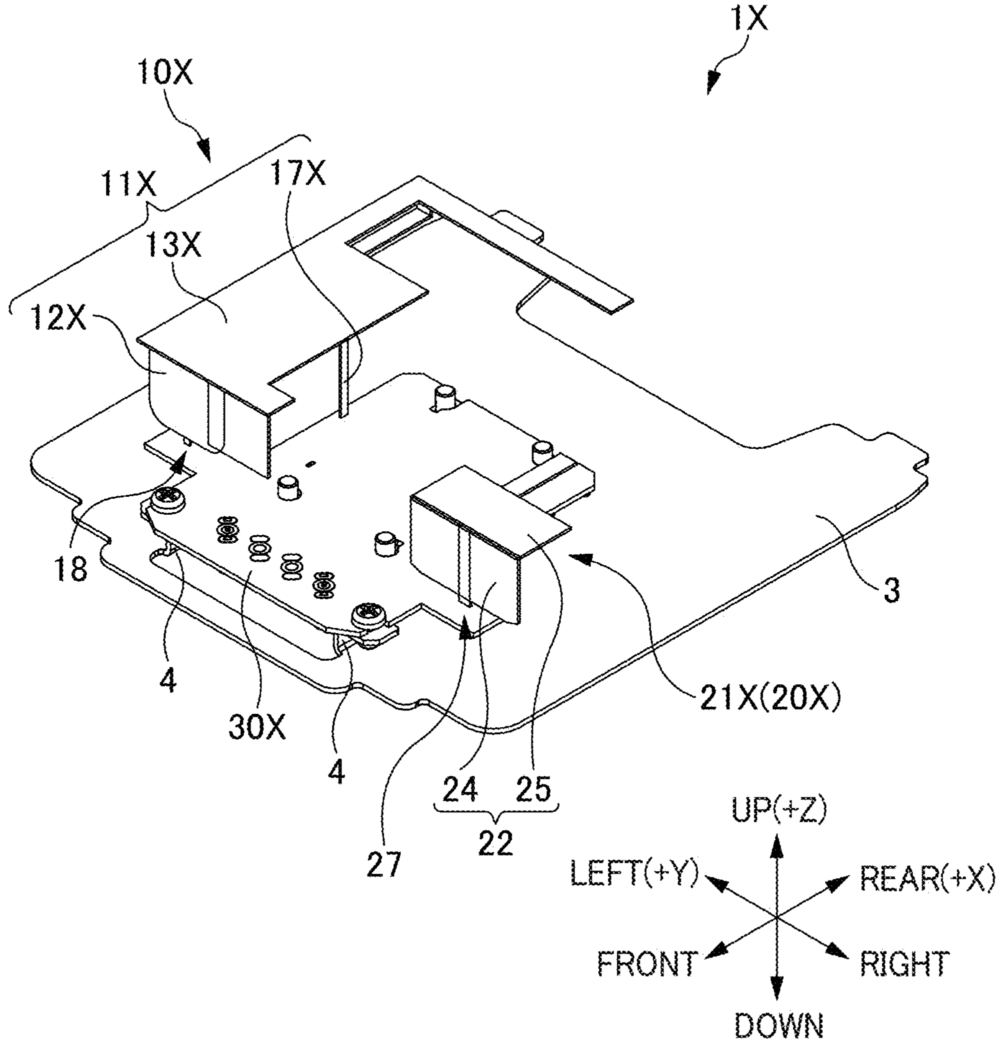
FIG. 5 is a perspective view of an antenna device 1X of a comparative example.

FIG. 5 is a perspective view of the antenna device 1X of the comparative example. FIG. 5 does not illustrate the case 2, which is the same as that of the antenna device 1A according to the embodiment of the present disclosure, in the antenna device 1X.

In the antenna device 1X of the comparative example, a second element 21X of an antenna 20X does not include a configuration corresponding to the additional element portion 23 of the antenna device 1A according to the embodiment of the present disclosure, as illustrated in FIG. 5. Accordingly, the antenna device 1X of the comparative example does not include the capacitive coupling portion 35 of the antenna device 1A according to the embodiment of the present disclosure. The antenna device 1X of the comparative example does not include a configuration corresponding to the filter 40, either.

The configuration of the antenna device 1X of the comparative example is the same as that of the antenna device 1A of the first embodiment except that the above-described additional element portion 23 and filter 40 are not included. Specifically, the antenna device 1X of the comparative example includes an antenna 10X, which is the same as the antenna 10A of the antenna device 1A according to the embodiment of the present disclosure, and a base portion 30X, which is the same as the base portion 30A of the antenna device 1A according to the embodiment of the present disclosure. The base portion 30X is coupled to a first element 11X of the antenna 10X and the second element 21X of the antenna 20X.

The configuration of the first element 11X of the antenna 10X of the comparative example is the same as that of the first element 11A of the antenna 10A according to the embodiment of the present disclosure. Specifically, the first element 11X includes: a standing portion 12X, which is the same as the standing portion 12A according to the embodiment of the present disclosure; an extending portion 13X, which is the same as the extending portion 13A according to the embodiment of the present disclosure; and a short-circuit portion 17X, which is the same as the short-circuit portion 17A according to the embodiment of the present disclosure. The first element 11X includes portions individually corresponding to the low-frequency, mid-frequency, and high-frequency bands similarly to the antenna device 1A embodiment (detailed illustration thereof is omitted).

Next, the antenna 10A according to the embodiment of the present disclosure and the antenna 10X of the comparative example are compared in frequency characteristics.

<<Comparison of Frequency Characteristics>>

Figure 6A:
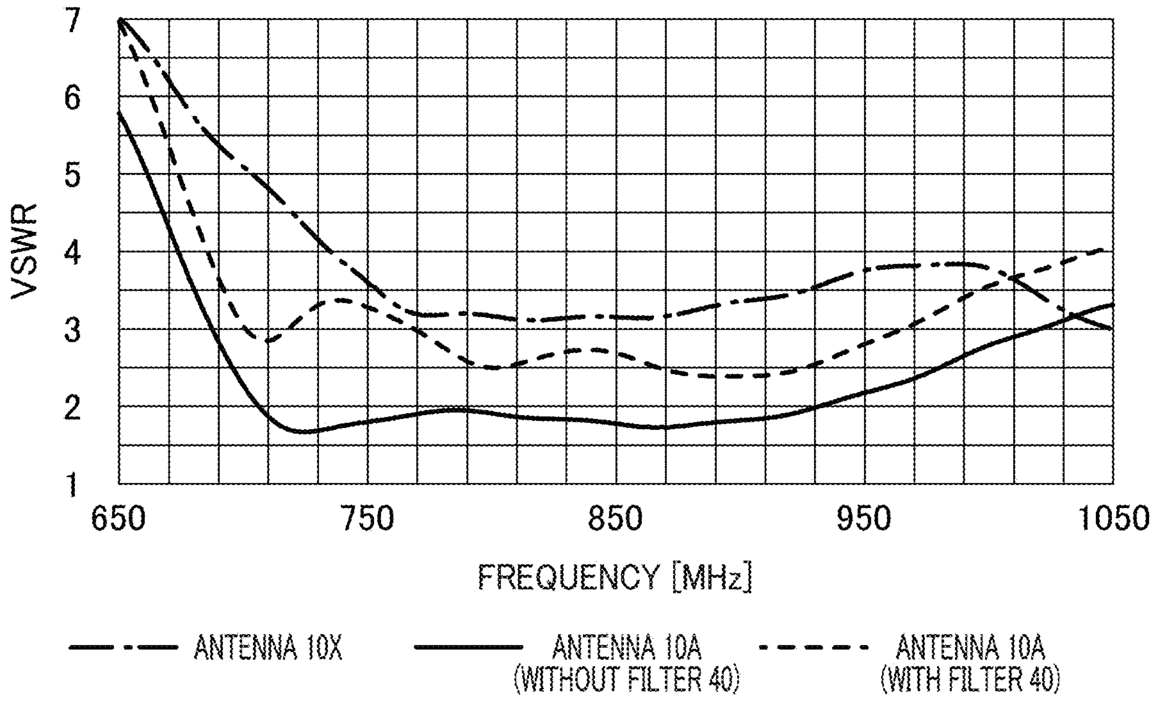
FIGS. 6A and 6B are graphs illustrating frequency characteristic examples of an antenna 10A of the first embodiment and an antenna 10X of the comparative example in a low-frequency band.
Figure 6B:
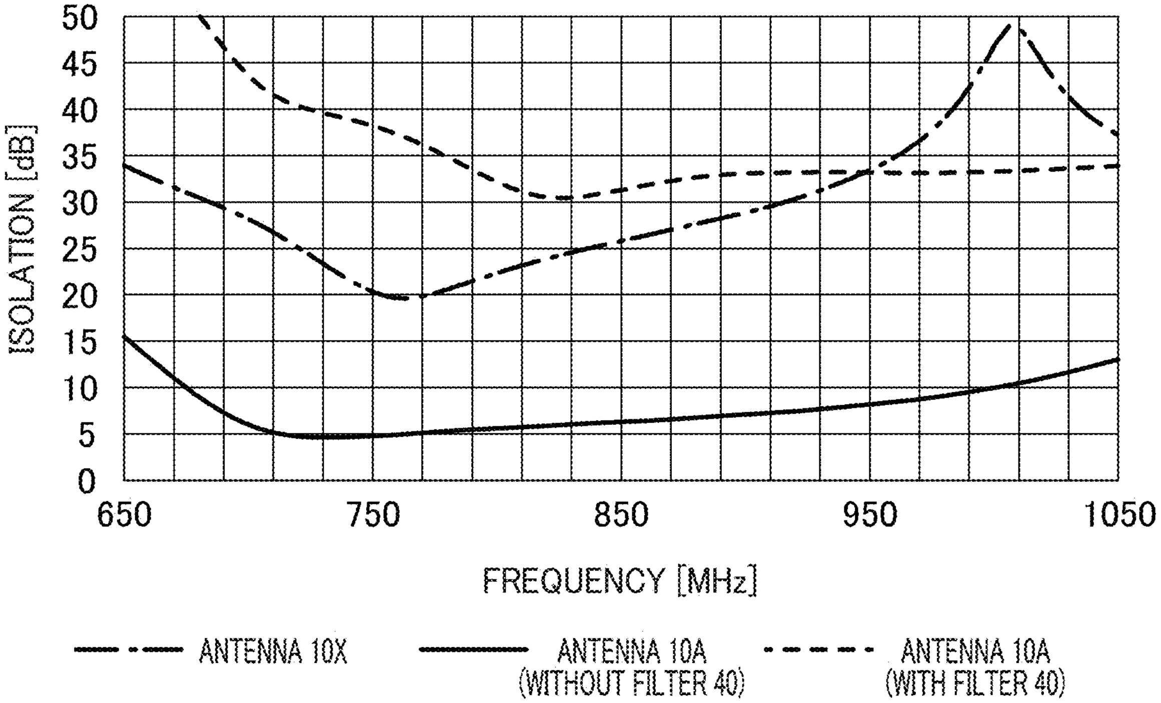

FIGS. 6A and 6B are graphs illustrating frequency characteristic examples of the antenna 10A according to the embodiment of the present disclosure and the antenna 10X of the comparative example, in the low-frequency band. FIG. 6A is a graph of VSWR of the antennas 10A and 10X in the low-frequency band, and FIG. 6B is a graph of isolation of the antennas 10A and 10X in the low-frequency band.

Figure 7A:
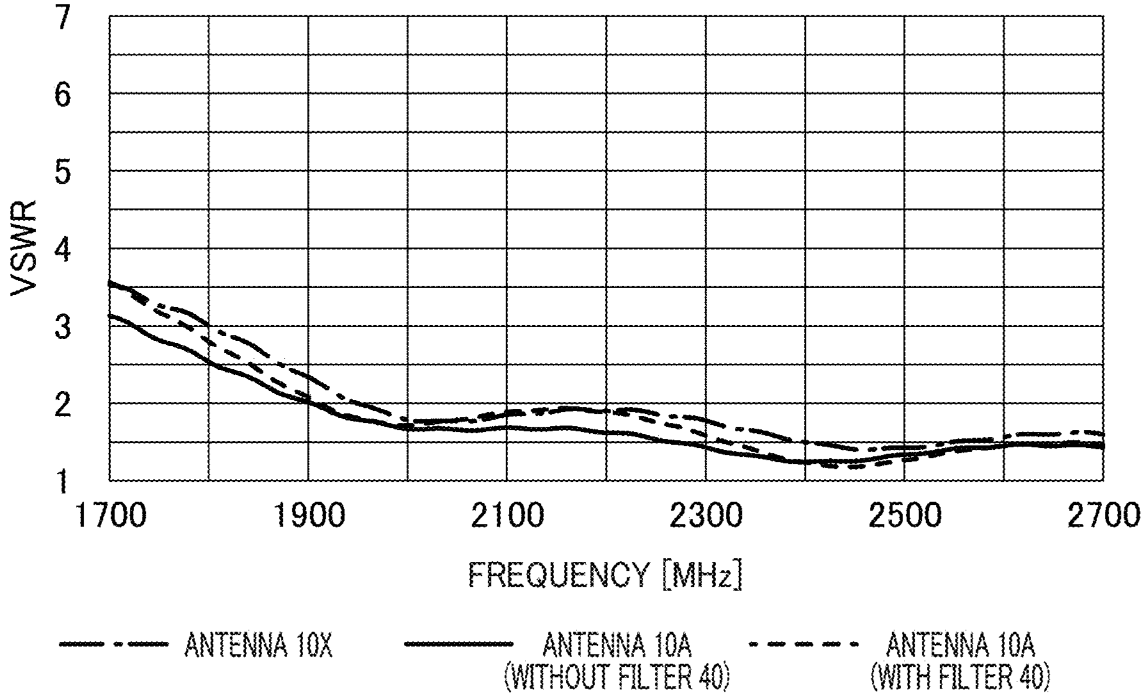
FIGS. 7A and 7B are graphs illustrating frequency characteristic examples of the antenna 10A of the first embodiment and the antenna 10X of the comparative example in a mid-frequency band.
Figure 7B:
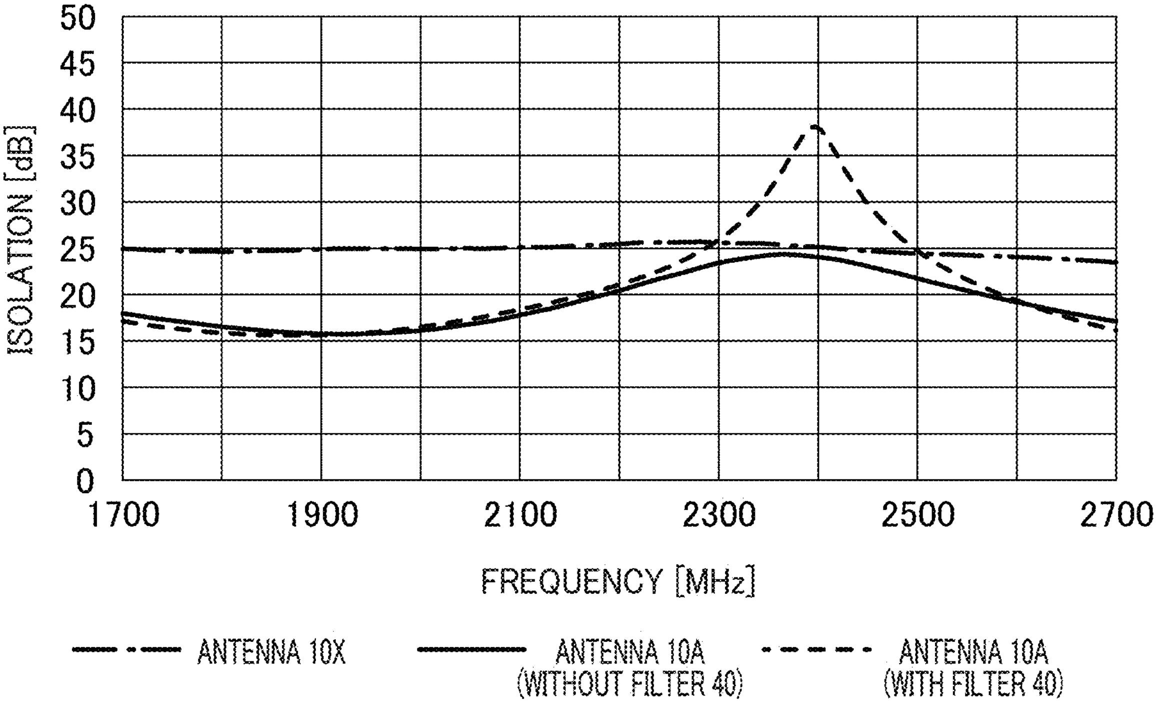

FIGS. 7A and 7B are graphs illustrating frequency characteristic examples of the antenna 10A of the first embodiment and the antenna 10X of the comparative example, in the mid-frequency band. FIG. 7A is a graph of VSWR of the antennas 10A and 10X in the mid-frequency band, and FIG. 7B is a graph of isolation of the antennas 10A and 10X in the mid-frequency band.

Figure 8A:
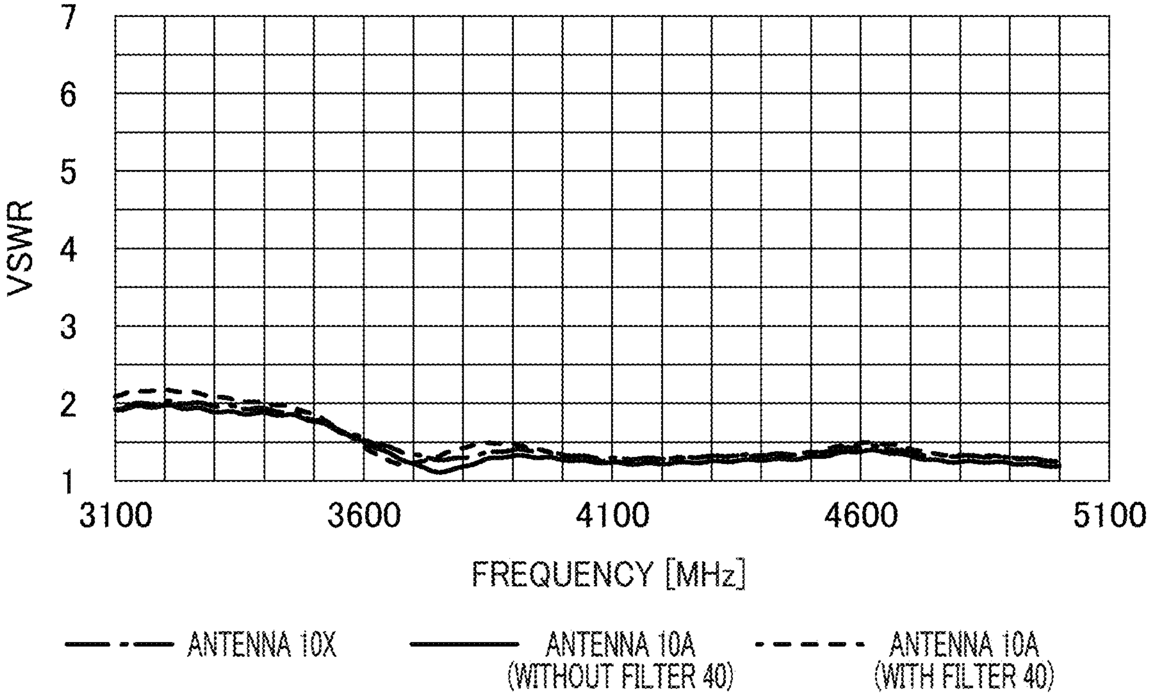
FIGS. 8A and 8B are graphs illustrating frequency characteristic examples of the antenna 10A of the first embodiment and the antenna 10X of the comparative example in a high-frequency band.
Figure 8B:
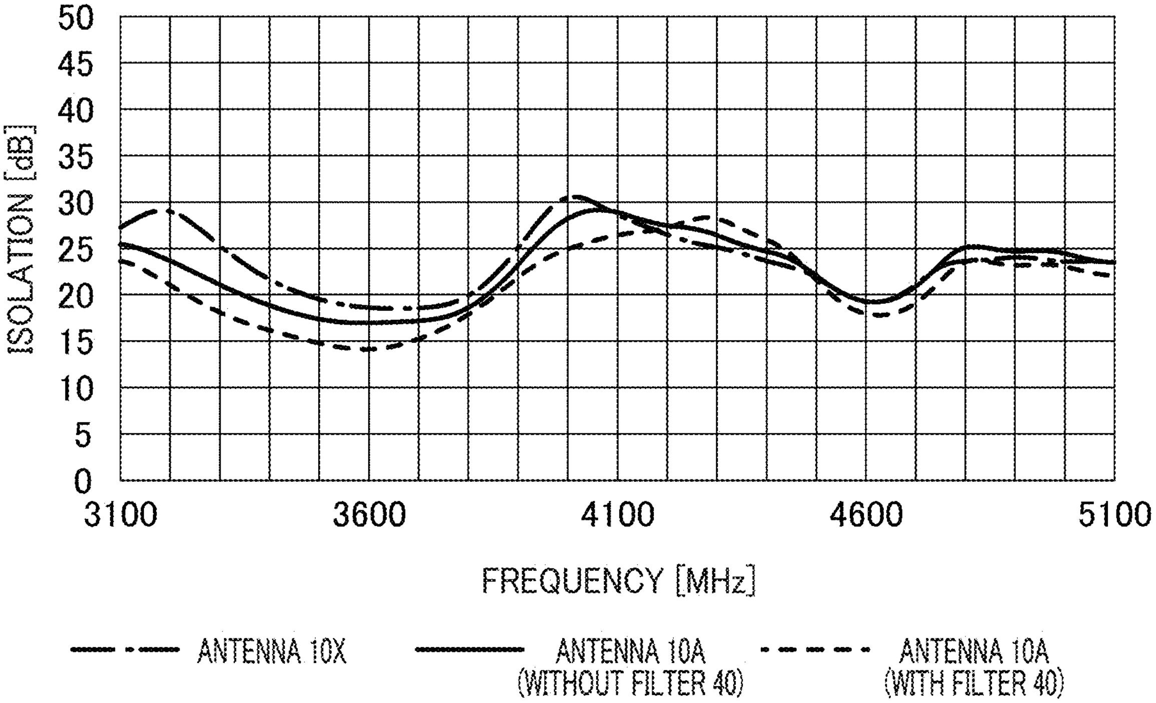

FIGS. 8A and 8B are graphs illustrating frequency characteristic examples of the antenna 10A according to the embodiment of the present disclosure and the antenna 10X of the comparative example in the high-frequency band. FIG. 8A is a graph of VSWR of the antennas 10A and 10X in the high-frequency band, and FIG. 8B is a graph of isolation of the antennas 10A and 10X in the high-frequency band.

In FIGS. 6A, 7A, and 8A, the horizontal axis represents frequency, and the vertical axis represents VSWR. In FIGS. 6B, 7B, and 8B, the horizontal axis represents frequency, and the vertical axis represents isolation. In each of the graphs, the result of the antenna 10X of the comparative example is given by a dashed-dotted line.

The frequency characteristics of the antenna 10A according to the embodiment of the present disclosure are compared between the case where the antenna 10A does not include the filter 40 (the antenna 10A without the filter 40) and the case where the antenna 10A includes the filter 40 (the antenna 10A with the filter 40). In each of the graphs, the result of the antenna 10A without the filter 40 is given by a solid line, and the result of the antenna 10A with the filter 40 is given by a dashed line.

As illustrated in FIG. 6A, the VSWR characteristics of the antenna 10X of the comparative example (the dashed-dotted line) are compared with the VSWR characteristics of the antenna 10A without the filter 40 according to the embodiment of the present disclosure (the solid line). It is then understood that the VSWR characteristics of the antenna 10A without the filter 40 according to the embodiment of the present disclosure are improved, in most of the low-frequency band, as compared with the characteristics of the antenna 10X of the comparative example.

Next, as illustrated in FIG. 6A, the VSWR characteristics of the antenna 10X of the comparative example (the dashed-dotted line) are compared with the VSWR characteristics of the antenna 10A with the filter 40 according to the embodiment of the present disclosure (the dashed line). In this case as well, it is understood similarly that the VSWR characteristics of the antenna 10A with the filter 40 according to the embodiment of the present disclosure are improved, in most of the low-frequency band, as compared with the characteristics of the antenna 10X of the comparative example. However, as illustrated in FIG. 6A, the degree of improvement in VSWR characteristics of the antenna 10A with the filter 40 according to the embodiment of the present disclosure is smaller than that of the antenna 10A without the filter 40 described above.

As illustrated in FIG. 6B, the isolation of the antenna 10X of the comparative example (the dashed-dotted line) is compared with the isolation of the antenna 10A without the filter 40 according to the embodiment of the present disclosure (the solid line). It is then understood that the isolation of the antenna 10A without the filter 40 according to the embodiment of the present disclosure deteriorates, throughout the low-frequency band, as compared with that of the antenna 10X of the comparative example.

Meanwhile, as illustrated in FIG. 6B, the isolation of the antenna 10A without the filter 40 according to the embodiment of the present disclosure (the solid line) is compared with the isolation of the antenna 10A with the filter 40 according to the embodiment of the present disclosure (the dashed line). It is then understood that the isolation of the antenna 10A with the filter 40 according to the embodiment of the present disclosure is improved, throughout the low-frequency band, as compared with that of the antenna 10A without the filter 40 according to the embodiment of the present disclosure. It is also understood that the isolation of the antenna 10A with the filter 40 is improved, as compared with that of the antenna 10X of the comparative example, with some exceptions.

From the aforementioned verification results, it is understood that the antenna device 1A according to the embodiment of the present disclosure is improved, in frequency characteristics in the low-frequency band, as compared with the antenna device 1X of the comparative example. As described above, in the antenna device 1A according to the embodiment of the present disclosure, the end portions of the first and second elements 11A and 21A are positioned adjacent to each other, to thereby be capacitively coupled. This implements the capacitive coupling portion 35, thereby being able to expand the band corresponding to the low-frequency band supported by the first element 11A toward the lower frequency side, in the antenna device 1A according to the embodiment of the present disclosure.

Furthermore, the antenna device 1A according to the embodiment of the present disclosure includes the filter 40, thereby being able to improve isolation.

Although the detailed description is omitted, the characteristics (VSWR and isolation) of the antenna 10A according to the embodiment of the present disclosure are good in the mid/high frequency band as well, with some exceptions, as illustrated in FIGS. 7A, 7B, 8A, and 8B.

Second Embodiment

In the antenna device 1A of the aforementioned first embodiment, the capacitive coupling portion 35 is implemented by the end portion of the first element 11A and a part (the end portion of the second element 21A) of the antenna 20A. However, the second element (second elements 21B to 21D) may be configured with a parasitic element as in antenna devices 1B and 1C according to the embodiment of the present disclosure which will be described later.

<<Antenna Device 1B of First Example>>

Figure 9:
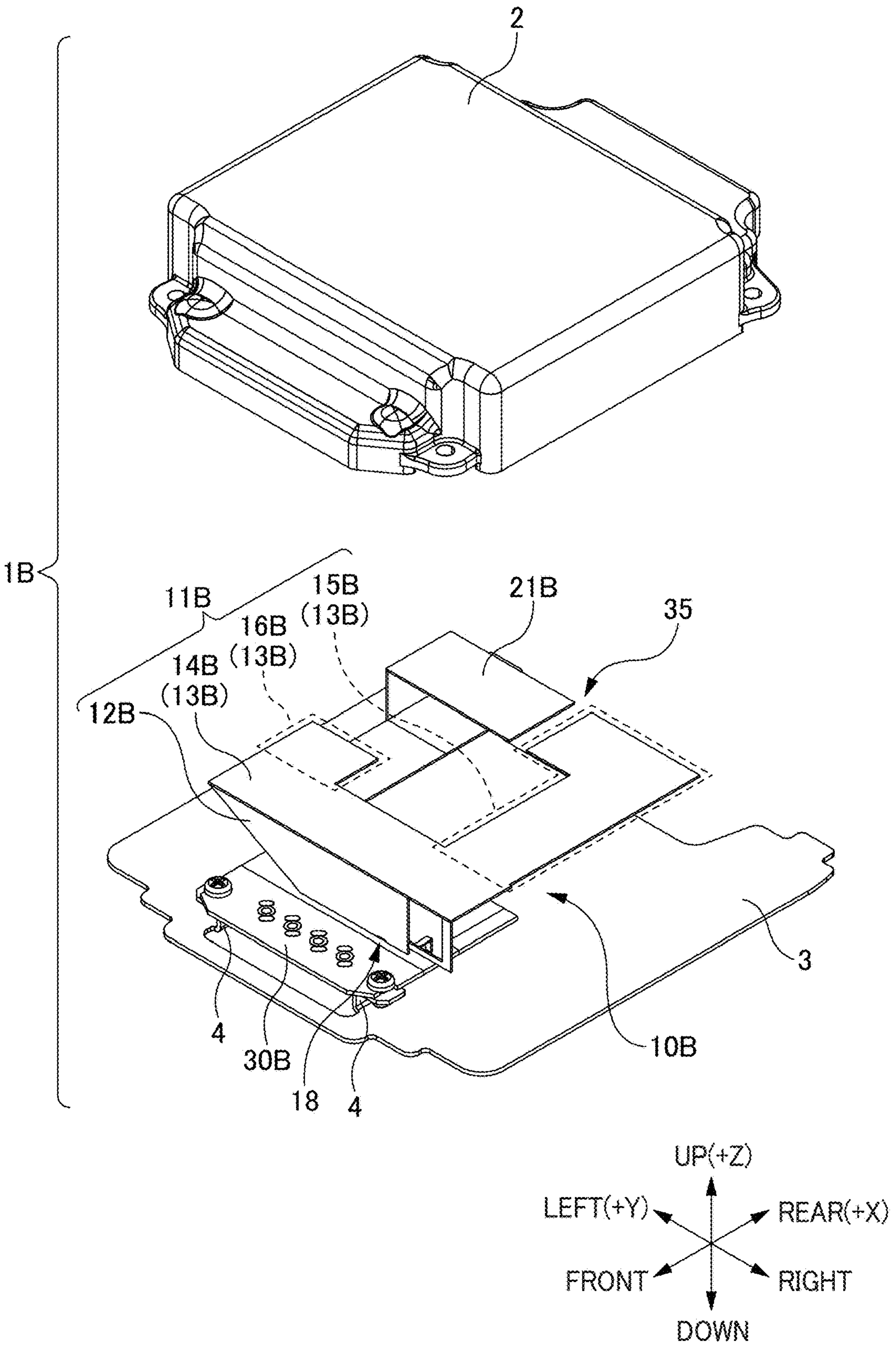
FIG. 9 is an exploded perspective view illustrating an antenna device 1B of a first example of a second embodiment.

FIG. 9 is an exploded perspective view of the antenna device 1B of a first example of a second embodiment. FIG. 9 illustrates an exploded perspective view of the antenna device 1B with the case 2 moved upward for illustration of the internal configuration of the antenna device 1B.

In the antenna device 1B of the first example of the embodiment of the present disclosure, a second element 21B to implement the capacitive coupling portion 35 is a parasitic element. The second element 21B is formed so as to stand from the ground portion 3 and be adjacent to a first additional portion 15B of a first element 11B of an antenna 10B.

This also makes it possible to generate two resonances in the low-frequency band, with the first element 11B of the antenna 10B and the second element 21B which is a parasitic element, in the antenna device 1B of the first example of the embodiment of the present disclosure, thereby being able to expand the band corresponding to the low-frequency band supported by the first element 11B further to the lower frequency side. Accordingly, the antenna 10B of the antenna device 1B according to the embodiment of the present disclosure can easily achieve a wider frequency band.

The configuration of the antenna device 1B of the first example of the embodiment of the present disclosure is similar, although including a slight difference in shape, to that of the previously described antenna device 1A except the configuration of the aforementioned second element 21B. Specifically, similarly to the antenna device 1A of the first embodiment, the first element 11B of the antenna 10B is coupled to the base portion 30B, and includes a standing portion 12B, an extending portion 13B, and a short-circuit portion not illustrated in FIG. 9. The extending portion 13B includes a main portion 14B, a first additional portion 15B, and a second additional portion 16B.

The antenna device 1B of the first example of the embodiment of the present disclosure mainly supports the low-frequency band with the standing portion 12B, main portion 14B, first additional portion 15B, and not-illustrated short-circuit portion. The antenna device 1B of the first example of the embodiment of the present disclosure mainly supports the mid-frequency band with the standing portion 12B, main portion 14B, second additional portion 16B, and a short-circuit portion (not-illustrated). The antenna device 1B of the first example of the embodiment of the present disclosure mainly supports the high-frequency band with the standing portion 12B.

In the antenna device 1B of the first example of the aforementioned second embodiment, the standing portion 12B of the first element 11B is formed so as to stand on the upper side of the base portion 30B. However, the configuration of the first element is not limited to this.

<<Antenna Device 1C of Second Example>>

Figure 10:
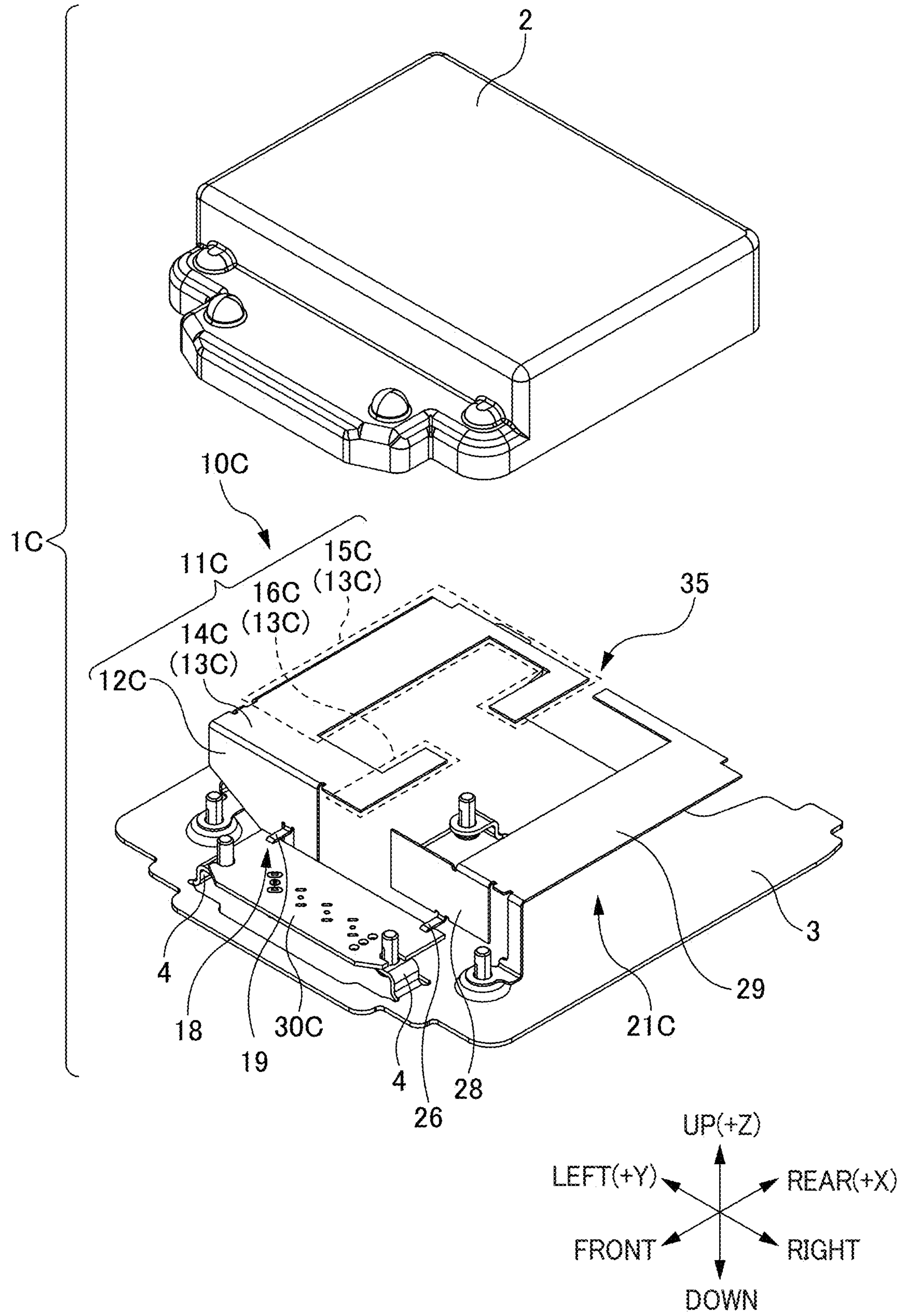
FIG. 10 is an exploded perspective view illustrating an antenna device 1C of a second example of the second embodiment.
Figures 11A, 11B, 11C:
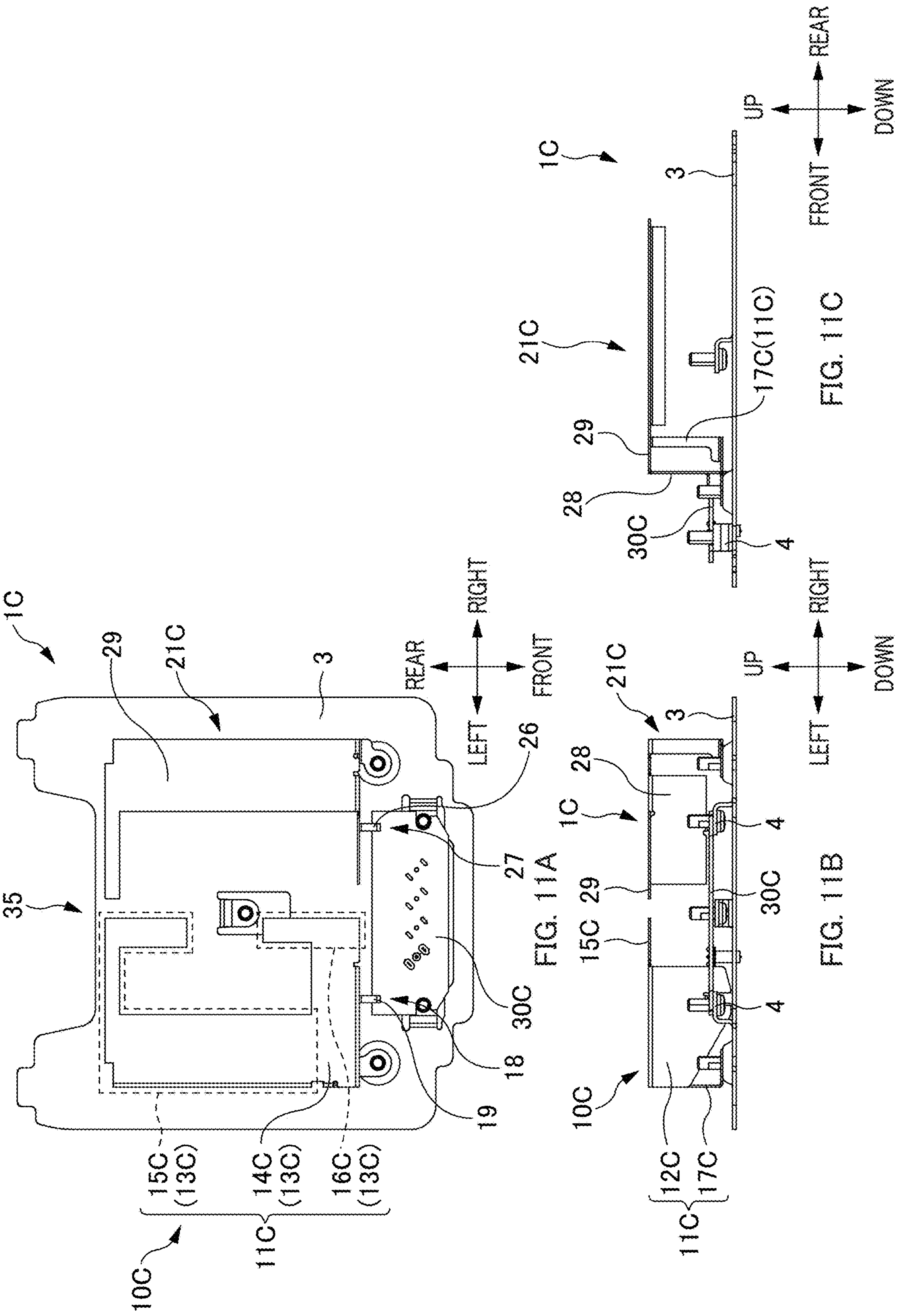
FIGS. 11A to 11C are three views illustrating the antenna device 1C of the second example of the second embodiment.
Figure 12A:
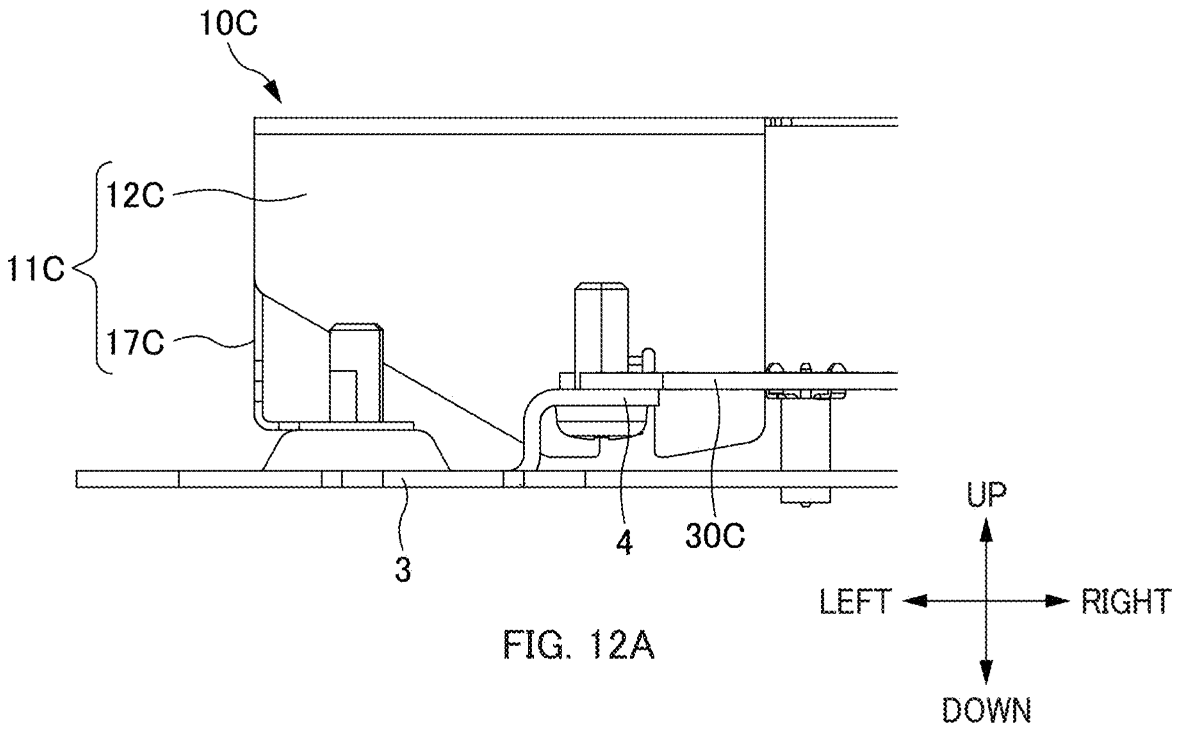
FIGS. 12A and 12B are views illustrating front and bottom faces of the antenna device 1C of the second example of the second embodiment.
Figure 12B:
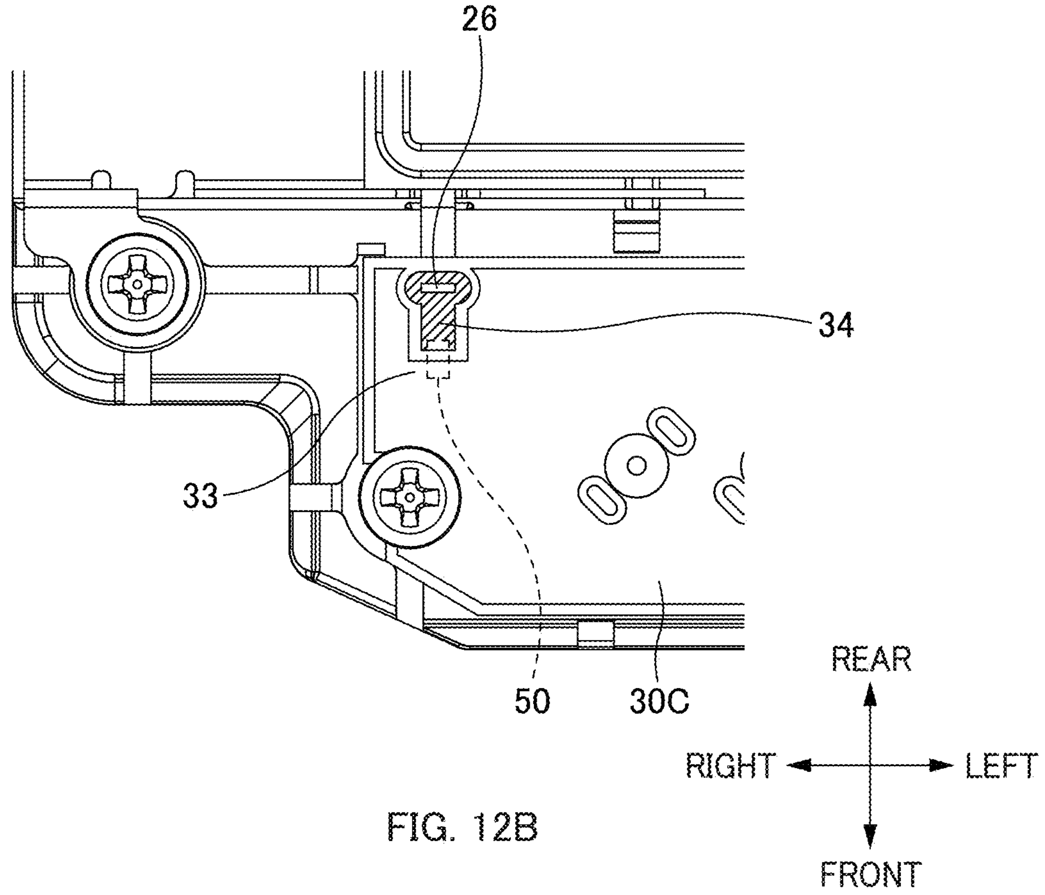

FIG. 10 is an exploded perspective view of the antenna device 1C of a second example of the second embodiment. FIGS. 11A to 11C illustrate three views illustrating the antenna device 1C of the second example of the second embodiment. FIG. 11A is a plan view of the antenna device 1C; FIG. 11B is a front view of the antenna device 1C; and FIG. 11C is a right side view of the antenna device 1C. FIGS. 12A and 12B are views respectively illustrating front and bottom faces of the antenna device 1C of the second example of the second embodiment. FIG. 12A is an enlarged view of the front face of a first element 11C; and FIG. 12B is a view illustrating a part coupled to a second element 21C in the bottom face of a base portion 30C and the surroundings of the part.

FIG. 10 illustrates an exploded perspective view of the antenna device 1C with the case 2 moved upward for illustration of the internal configuration of the antenna device 1C. FIGS. 11A to 11C do not illustrate the case 2 in the antenna device 1C.

The antenna device 1C of the second example of the embodiment of the present disclosure includes an antenna 10C and a base portion 30C, similarly to the antenna device 1A of the first embodiment and the antenna device 1B of the first example of the embodiment of the present disclosure.

The antenna 10C of the second example of the embodiment of the present disclosure includes the first element 11C and the feed portion 18, similarly to the antenna 10A of the first embodiment and the antenna 10B of the first example of the embodiment of the present disclosure. The first element 11C of the second example of the embodiment of the present disclosure has the same configuration as that of the first element 11A of the first embodiment and the first element 11B of the first example of the embodiment of the present disclosure. Specifically, the first element 11C includes a standing portion 12C, an extending portion 13C, and a short-circuit portion 17C (illustrated in FIGS. 11B and 11C). The extending portion 13C includes a main portion 14C, a first additional portion 15C, and a second additional portion 16C. However, the standing portion 12C of the second example of the embodiment of the present disclosure is spaced apart from the base portion 30C as will be described later, unlike the standing portion 12A of the first embodiment and the standing portion 12B of the first example of the embodiment of the present disclosure.

The first element 11C of the second example of the embodiment of the present disclosure mainly supports the low-frequency band, with the standing portion 12C, main portion 14C, first additional portion 15C, and short-circuit portion 17C, similarly to the first element 11A of the first embodiment. The antenna device 1C of the second example of the embodiment of the present disclosure mainly supports the mid-frequency band, with the standing portion 12C, main portion 14C, second additional portion 16C, and short-circuit portion 17C. The antenna device 1C of the second example of the embodiment of the present disclosure mainly supports the high-frequency band with the standing portion 12C.

In the antenna 10C of the second example of the embodiment of the present disclosure, the standing portion 12C is spaced apart from the base portion 30C in the +X direction. In other words, the standing portion 12C is positioned (offset) at a predetermined distance in the +X direction from the base portion 30C. Similarly, the end portion of the first element 11C on the base portion 30C side (i.e., the end portion of the main portion 14C on the base portion 30C side) is positioned (offset) at a predetermined distance in the +X direction from the end portion of the base portion 30C on the first element 11C side, as illustrated in FIG. 11A.

In the antenna 10C of the second example of the embodiment of the present disclosure, the standing portion 12C is spaced apart from the base portion 30C, such that the standing portion 12C can be provided so as to extend to the ground portion 3 side relative to the base portion 30C. In the antenna device 1C of the second example of the second embodiment, the standing portion 12C and the ground portion 3 are not electrically connected, as illustrated in FIG. 12A.

Similarly to the base portion 30A of the first embodiment, the base portion 30C is positioned between the extending portion 13C and the ground portion 3 as illustrated in FIG. 12A. In other words, the base portion 30C is positioned above the ground portion 3. The lower end portion of the standing portion 12C can be provided so as to extend to the ground portion 3 side relative to the base portion 30C positioned as such, in the antenna device 1C of the second example of the embodiment of the present disclosure.

When the size in the up-down direction in the antenna device 1C is strictly limited, for example, it may be difficult to secure the length of the standing portion 12C. Furthermore, when the base portion 30C is positioned above the ground portion 3, as in the antenna device 1C of the second example of the embodiment of the present disclosure, and the standing portion 12C is provided so as to stand from the base portion 30C, it is more difficult to secure the length of the standing portion 12C in the up-down direction.

Thus, the lower end portion of the standing portion 12C is provided so as to extend further to the ground portion 3 side, as in the antenna 10C of the second example of the embodiment of the present disclosure, thereby making it easier to secure the length of the standing portion 12C in the up-down direction. This makes it easier to form the standing portion 12C so as to have a length corresponding to a wavelength (e.g., the wavelength at 699 MHz) used in the low-frequency band.

In the antenna device 1C of the second example of the embodiment of the present disclosure, a first element coupling portion 19 is provided at the end portion in the down direction (in the −Z direction) of the standing portion 12C, as illustrated in FIGS. 10 and 11A. The first element coupling portion 19 is a portion of the first element 11C and is coupled to the base portion 30C. This couples the first element 11C and the base portion 30C.

In the antenna device 1C of the second example of the embodiment of the present disclosure as well, a second element 21C, which implements the capacitive coupling portion 35, is a parasitic element, similarly to the first example. The second element 21C of the second example of the embodiment of the present disclosure includes a standing portion 28 and an extending portion 29.

The standing portion 28 is a portion formed in the second element 21C so as to stand against the base portion 30C. In the second example of the embodiment of the present disclosure, the standing portion 28 is formed so as to stand in the up direction against the base portion 30C. The direction in which the standing portion 28 stands against the base portion 30C is not limited to the up direction (the +Z direction), and may be a direction inclined at a predetermined angle relative to the base portion 30C.

In the antenna device 1C of the second example of the embodiment of the present disclosure, a second element coupling portion 26 is provided at the end portion in the down direction (in the −Z direction) of the standing portion 28, as illustrated in FIG. 10. The second element coupling portion 26 is a portion of the second element 21C and is coupled to the base portion 30C. This couples the second element 21C and the base portion 30C.

The extending portion 29 is a portion formed so as to extend from the standing portion 28. Further, the extending portion 29 is a portion formed so as to face the ground portion 3. In the second example of the embodiment of the present disclosure, the extending portion 29 is formed so as to extend from the upper end portion of the standing portion 28, as illustrated in FIGS. 10 and 11C. However, the extending portion 29 may be formed so as to extend from a part of the standing portion 28 other than the upper end portion. That is, the extending portion 29 may be formed so as to extend from a position in the up-down direction in the standing portion 28. Note that the direction in which the extending portion 29 extends is not limited to the direction parallel to the face of the ground portion 3, and may be a direction inclined at a predetermined angle relative to the direction parallel to the face of the ground portion 3.

In the antenna device 1C of the second example of the embodiment of the present disclosure, the end portion of the extending portion 29 is provided so as to be adjacent to the end portion of the first additional portion 15C in the extending portion 13C of the first element 11C. Accordingly, in the second example of the embodiment of the present disclosure, the extending portion 29 is provided so as to be capacitively coupled to the end portion of the first element 11C. This implements the capacitive coupling portion 35 at the end portion of the extending portion 29 in the second example of the embodiment of the present disclosure as well.

The antenna device 1C of the second example of the second embodiment includes a circuit element 50 at a coupling portion that couples the second element 21C and the base portion 30C, as illustrated in FIG. 12B. The circuit element 50 is a resistor in the second example of the embodiment of the present disclosure. However, the circuit element 50 may be a configuration including another circuit element, such as a filter, in addition to the resistor. The circuit element 50 may be an attenuator instead of the resistor. This makes it possible to terminate signals in the low-frequency band supported by the antenna 10C, thereby being able to improve the characteristics of the antenna 10C in the low-frequency band.

As illustrated in FIG. 12B, the antenna device 1C of the second example of the embodiment of the present disclosure includes the circuit element 50 between the second element coupling portion 26 and a region coupled to the ground portion 3 in the base portion 30C. Specifically, the circuit element 50 is provided between a third region 33 and a fourth region 34. The third region 33 is a conductive region on the side coupled to the ground portion 3, and the fourth region 34 is a conductive region on the side coupled to the second element 21C. This makes it possible to improve the characteristics of the antenna (the antenna 10C herein), included in the antenna device 1C, in the low-frequency band (699 to 960 MHz).

<<Verification of Frequency Characteristic>>

In the following, the antennas 10B and 10C of the embodiment of the present disclosure are compared in frequency characteristics.

Figure 13A:
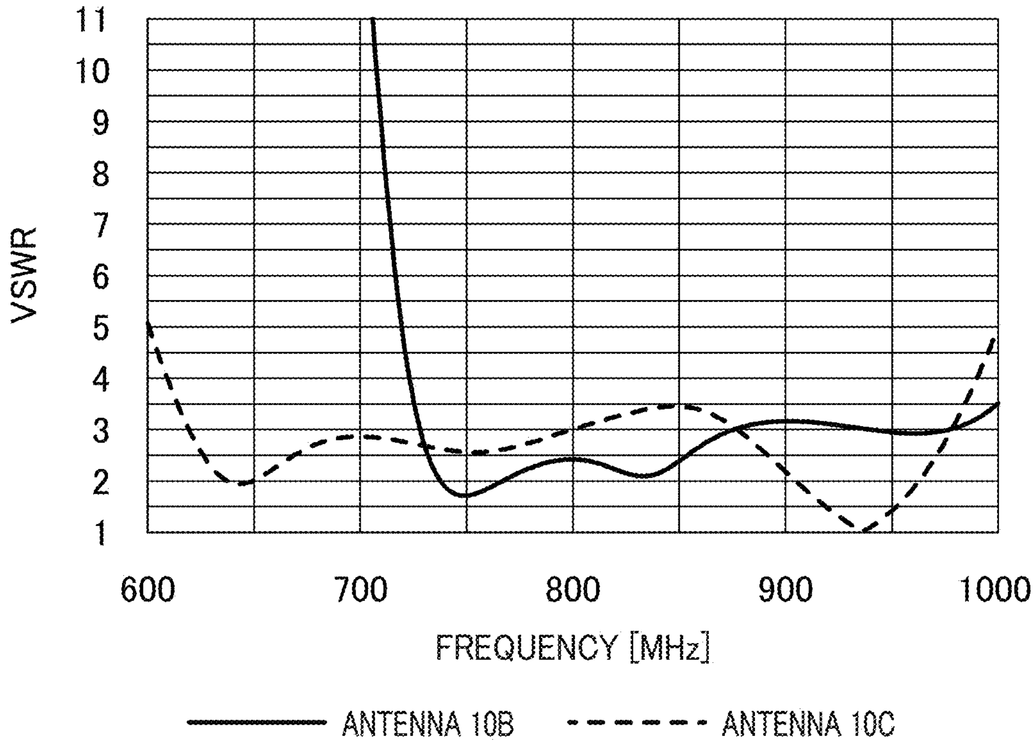
FIGS. 13A and 13B are graphs illustrating frequency characteristic examples of antennas 10B and 10C of the second embodiment in the low-frequency band.
Figure 13B:
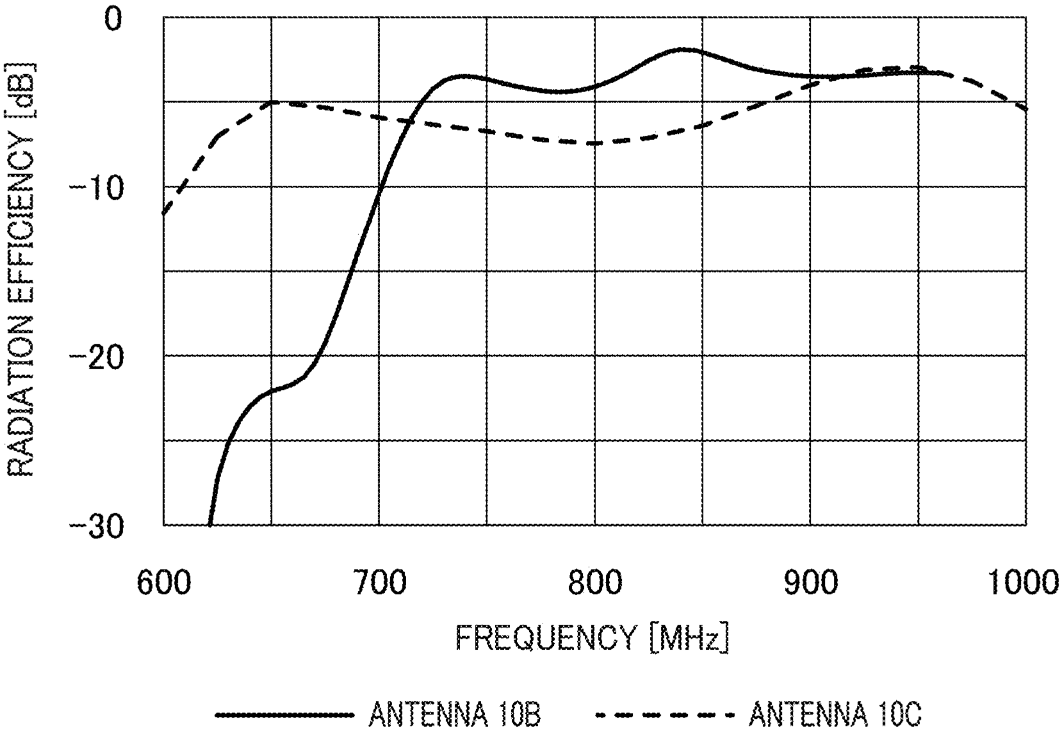

FIGS. 13A and 13B are graphs illustrating frequency characteristic examples of the antennas 10B and 10C according to the embodiment of the present disclosure, in the low-frequency band. FIG. 13A is a graph of VSWR of the antennas 10B and 10C in the low-frequency band, and FIG. 13B is a graph of radiation efficiency of the antennas 10B and 10C in the low-frequency band.

Figure 14A:
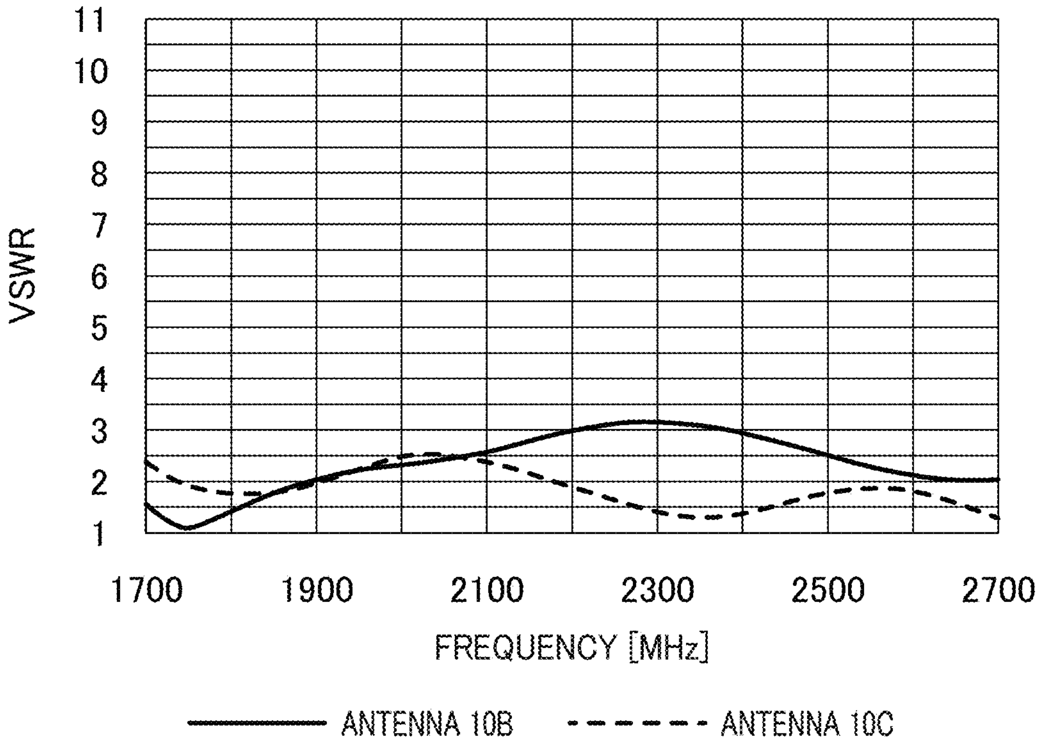
FIGS. 14A and 14B are graphs illustrating frequency characteristic examples of the antennas 10B and 10C of the second embodiment in the mid-frequency band.
Figure 14B:
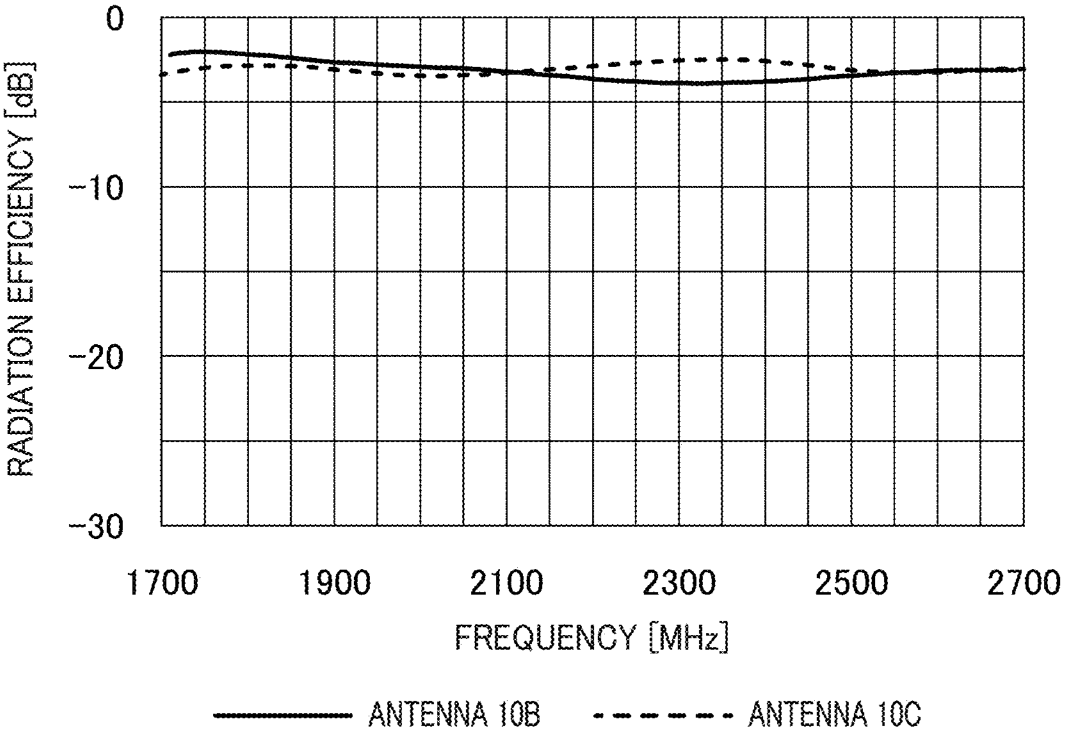

FIGS. 14A and 14B are graphs illustrating frequency characteristic examples of the antennas 10B and 10C of the second embodiment, in the mid-frequency band. FIG. 14A is a graph of VSWR of the antennas 10B and 10C in the mid-frequency band, and FIG. 14B is a graph of radiation efficiency of the antennas 10B and 10C in the mid-frequency band.

Figure 15A:
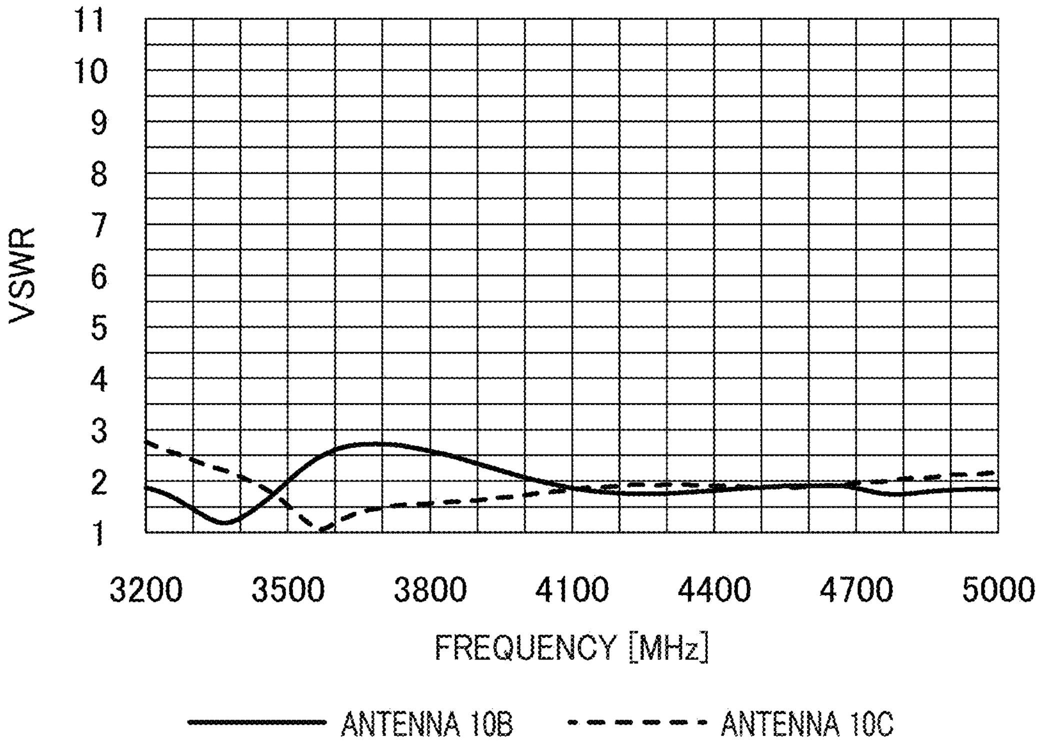
FIGS. 15A and 15B are graphs illustrating frequency characteristic examples of the antennas 10B and 10C of the second embodiment in the high-frequency band.
Figure 15B:
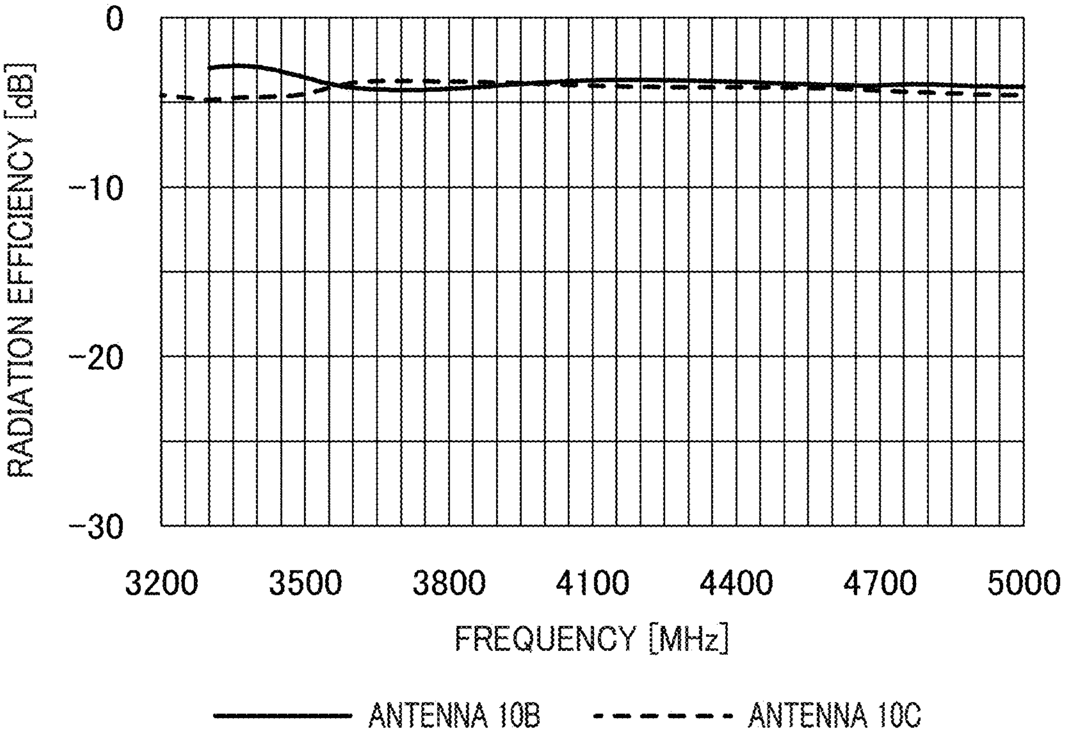

FIGS. 15A and 15B are graphs illustrating frequency characteristic examples of the antennas 10B and 10C of the second embodiment, in the high-frequency band. FIG. 15A is a graph of VSWR of the antennas 10B and 10C in the high-frequency band, and FIG. 15B is a graph of radiation efficiency of the antennas 10B and 10C in the high-frequency band.

In FIGS. 13A, 14A, and 15A, the horizontal axis represents frequency, and the vertical axis represents VSWR. In FIGS. 13B, 14B, and 15B, the horizontal axis represents frequency, and the vertical axis represents radiation efficiency. In each of the graphs, the result of the antenna 10B is given by a solid line, and the result of the antenna 10C is given by a solid line.

As illustrated in FIG. 13A, the VSWR characteristics of the antenna 10B (the solid line) are compared with the VSWR characteristics of the antenna 10C (the dashed line). Then, it is understood that the VSWR characteristics of the antenna 10C is improved, particularly in low frequencies (e.g., 600 to 700 MHz) in the low-frequency band, as compared to the characteristics of the antenna 10B. Similarly, as illustrated in FIG. 13B, it is understood that the radiation efficiency of the antenna 10C is improved, particularly in low frequencies (e.g., 600 to 700 MHz) in the low-frequency band, as compared with the antenna 10B.

In other words, it is understood that, in the antenna 10C, as described above, the lower end portion of the standing portion 12C can be provided so as to extend further to the ground portion 3 side, thereby making it easy to secure the length of the standing portion 12C in the up-down direction, which makes it easy to form the standing portion 12C so as to have a length corresponding to a wavelength (e.g., the wavelength at 699 MHz) used in the low-frequency band.

Although the detailed description is omitted, the characteristics (VSWR and radiation efficiency) of the antennas 10B and 10C of the embodiment of the present disclosure are good in the mid/high frequency band as well, with some exceptions, as illustrated in FIGS. 14A, 14B, 15A, and 15B.

Note that, in the antenna device 1C of the second example of the embodiment of the present disclosure, the antenna 10C and base portion 30C are arranged in a housing space defined by the case 2 and the ground portion 3, as in the antenna device 1A of the first embodiment. However, a part of a first element 11D of an antenna 10D may be provided outside the housing space, as in an antenna device 1D of a third example of the embodiment of the present disclosure.

<<Antenna Device 1D of Third Example>>

Figure 16A:
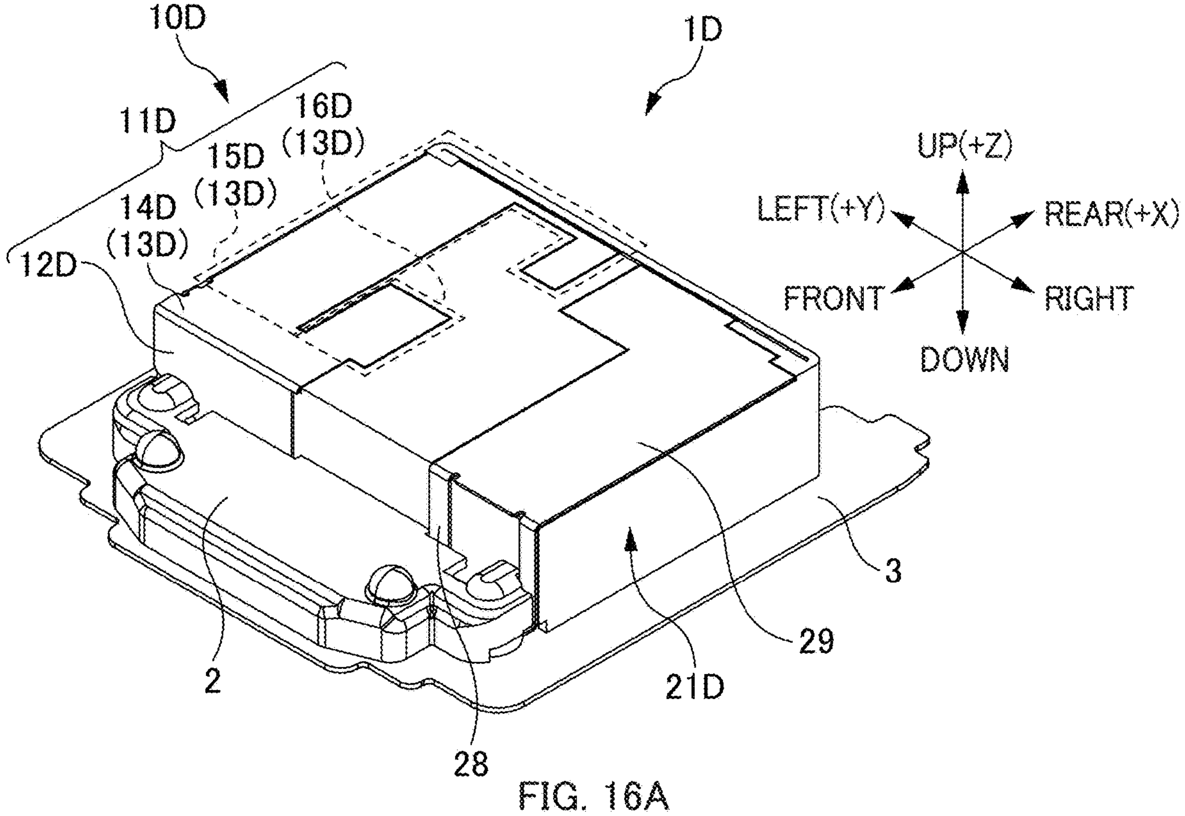
FIGS. 16A and 16B are perspective views of an antenna device 1D of a third example of the second embodiment.
Figure 16B:
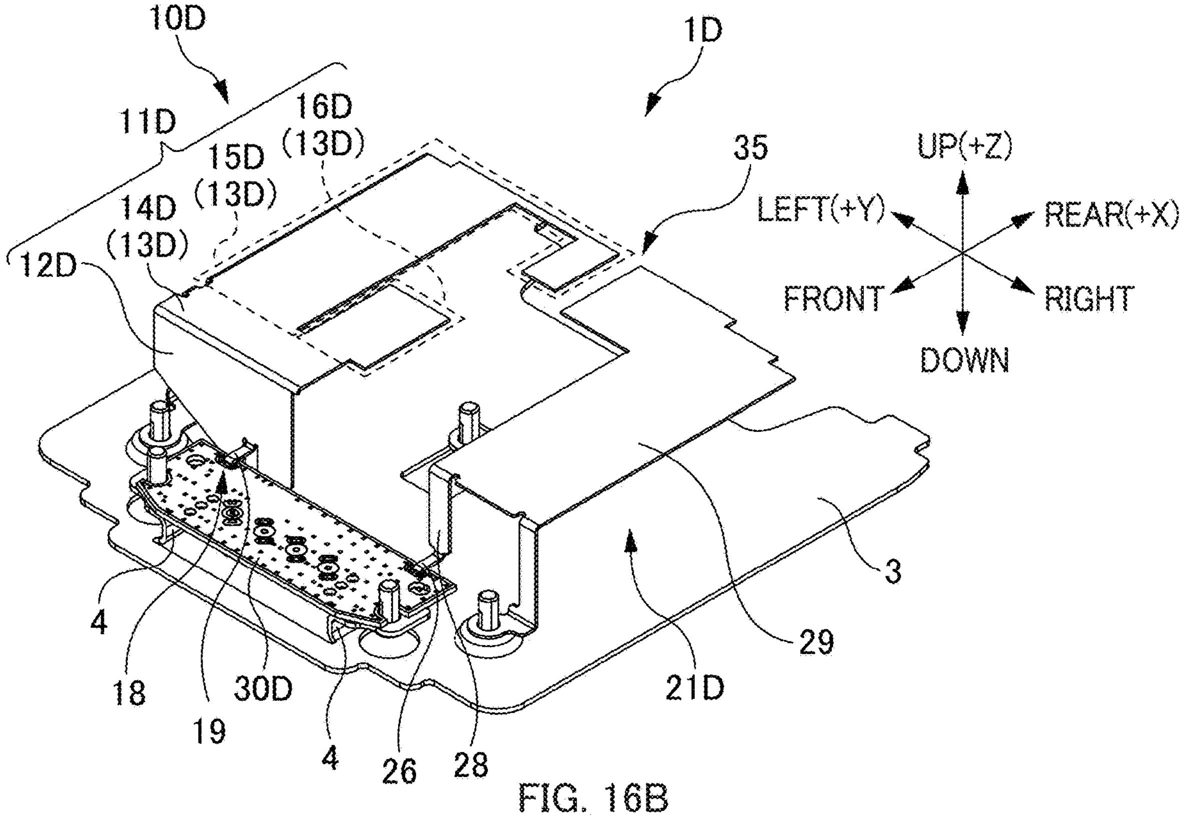

FIGS. 16A and 16B are perspective views of the antenna device 1D of the third example of the second embodiment. FIG. 16A is an overall perspective view of the antenna device 1D, and FIG. 16B is a perspective view of the antenna device 1D with the case 2 removed. FIG. 16B does not illustrate the case 2 for illustration of the internal configuration of the antenna device 1D.

The antenna device 1D of the third example of the embodiment of the present disclosure has a configuration similar, although including a slight difference in shape, to the aforementioned antenna device 1D of the second example of the embodiment of the present disclosure, except the positions where the first and second elements 11D and 21D are arranged. The following mainly descries differences from the antenna device 1D of the second example of the embodiment of the present disclosure.

In the antenna device 1D of the third example of the second embodiment, a part of the first element 11D of the antenna 10D is arranged outside the case 2, as illustrated in FIG. 16A. Further, a part of the second element 21D is also arranged outside the case 2. Specifically, a part of the upper portion of the standing portion 12D of the first element 11D is arranged on the front side relative to the case 2, and the entire extending portion 13D of the first element 11D is arranged above the case 2. Further, a part of the upper portion of the standing portion 28 of the second element 21D is arranged on the front side relative to the case 2, and the entire extending portion 29 of the second element 21D is arranged above the case 2.

In the antenna device 1D of the third example of the embodiment of the present disclosure, the end portion of the extending portion 29 is provided so as to be adjacent to the end portion of the first additional portion 15D in the extending portion 13D of the first element 11D, similarly to the antenna 10C of the second example of the embodiment of the present disclosure. Accordingly, the extending portion 29 is provided so as to be capacitively coupled to the end portion of the first element 11D in the third example of the embodiment of the present disclosure. This also implements the capacitive coupling portion 35 at the end portion of the extending portion 29, as illustrated in FIG. 16B, in the third example of the embodiment of the present disclosure.

However, the positions where the first and second elements 11D and 21D are arranged are not limited to the positions illustrated in FIGS. 16A and 16B. The entire first element 11D may be arranged outside the case 2, or the entire second element 21D may be arranged outside the case 2. The entire or part of the first element 11D may be arranged outside the case 2, while the entire second element 21D may be arranged inside the case 2. The entire first element 11D may be arranged inside the case 2, while the entire or part of the second element 21D is arranged outside the case 2.

<<Verification of Frequency Characteristics>>

In the following, the frequency characteristics of the antenna 10D according to the embodiment of the present disclosure are verified.

Figure 17A:
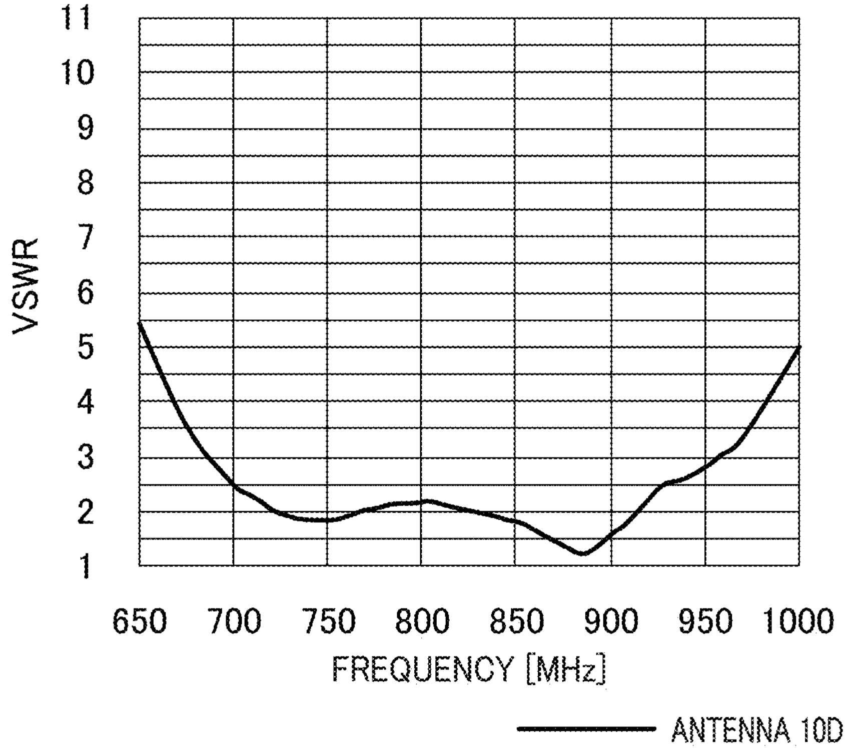
FIGS. 17A and 17B are graphs illustrating frequency characteristic examples of an antenna 10D of the second embodiment in the low-frequency band.
Figure 17B:
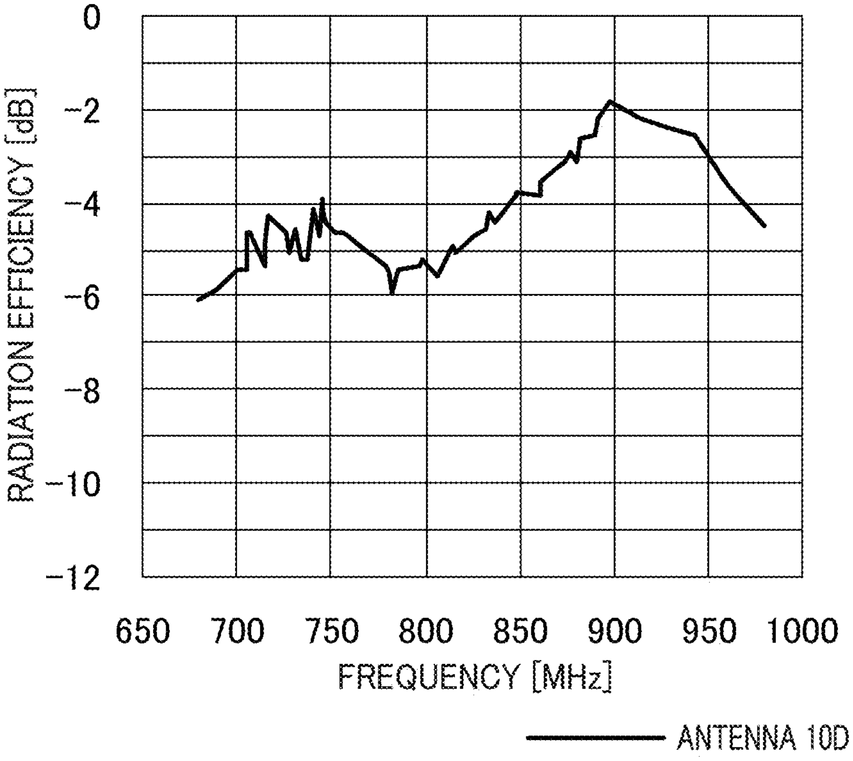

FIGS. 17A and 17B are graphs illustrating frequency characteristic examples of the antenna 10D of the second embodiment, in the low-frequency band. FIG. 17A is a graph of VSWR of the antenna 10D in the low-frequency band; and FIG. 17B is a graph of radiation efficiency of the antenna 10D in the low-frequency band.

Figure 18A:
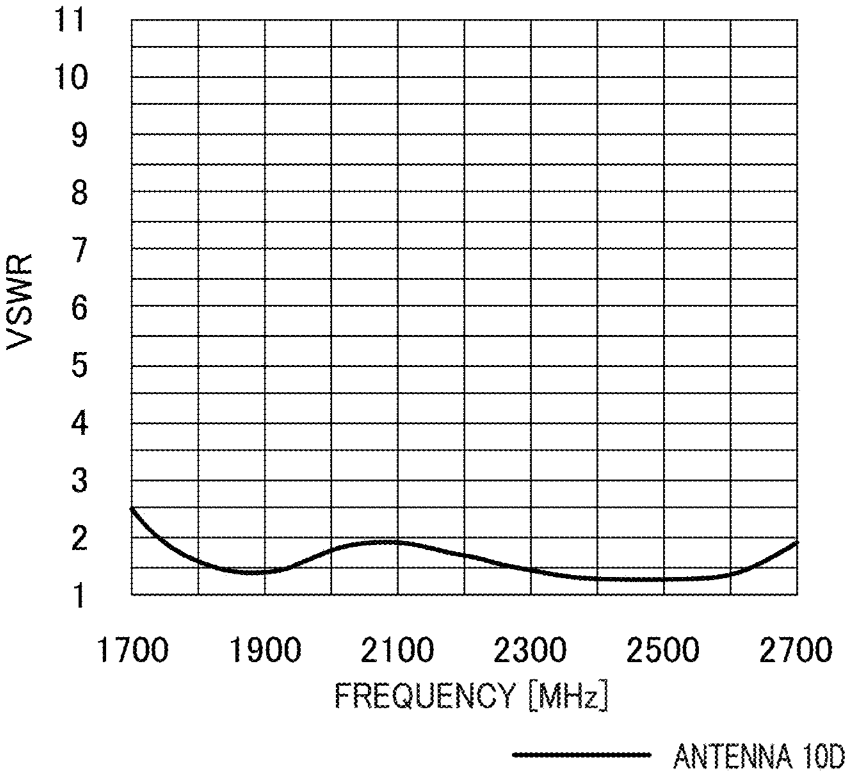
FIGS. 18A and 18B are graphs illustrating frequency characteristic examples of the antenna 10D of the second embodiment in the mid-frequency band.
Figure 18B:
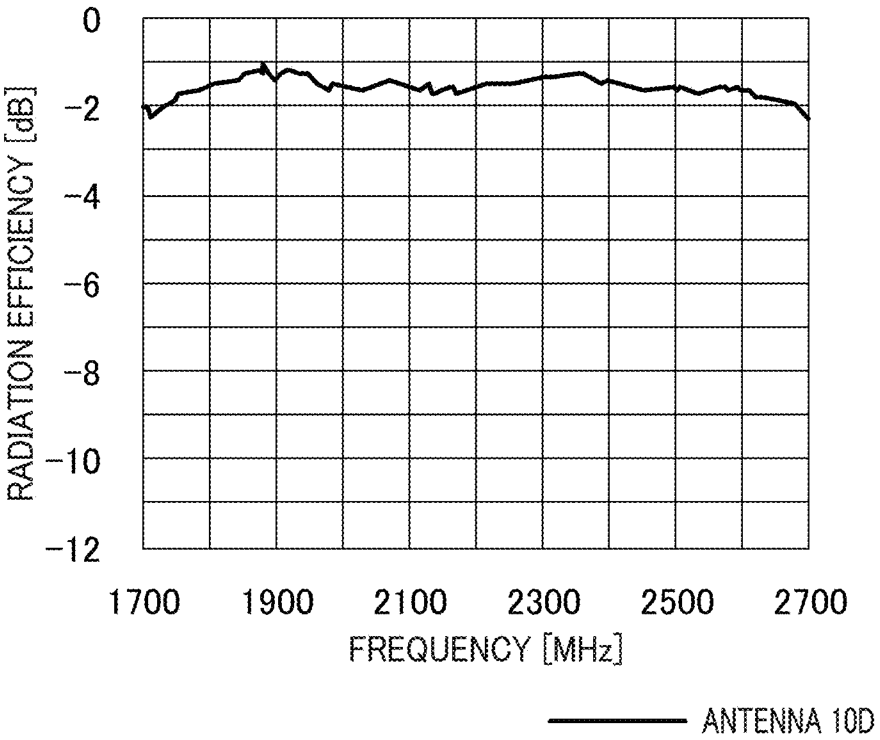

FIGS. 18A and 18B are graphs illustrating frequency characteristic examples of the antenna 10D of the second embodiment, in the mid-frequency band. FIG. 18A is a graph of VSWR of the antenna 10D in the mid-frequency band, and FIG. 18B is a graph of radiation efficiency of the antenna 10D in the mid-frequency band.

Figure 19A:
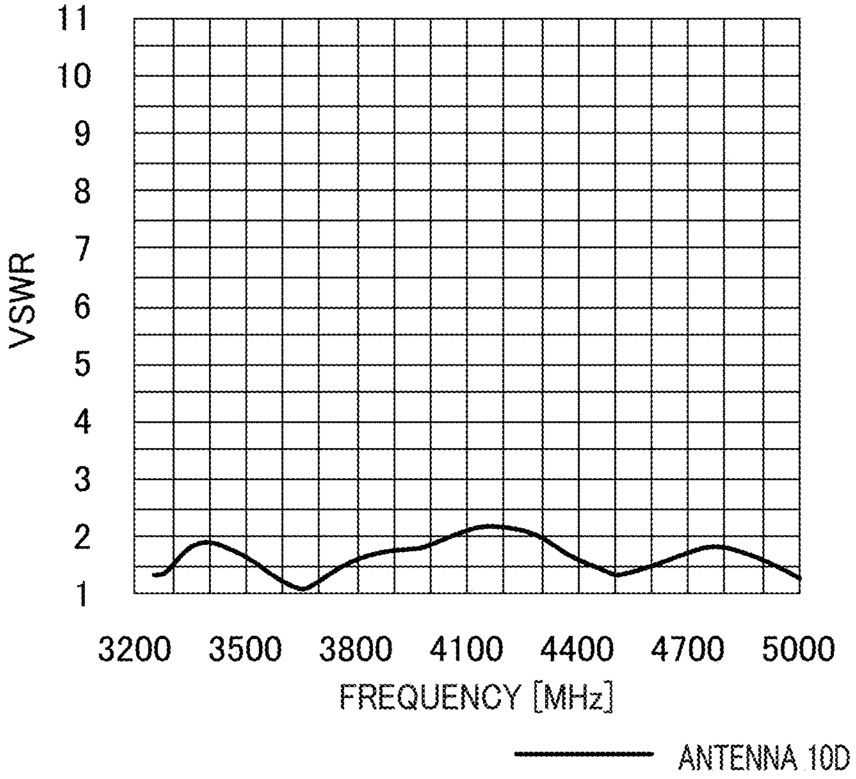
FIGS. 19A and 19B are graphs illustrating frequency characteristic examples of the antenna 10D of the second embodiment in the high-frequency band.
Figure 19B:
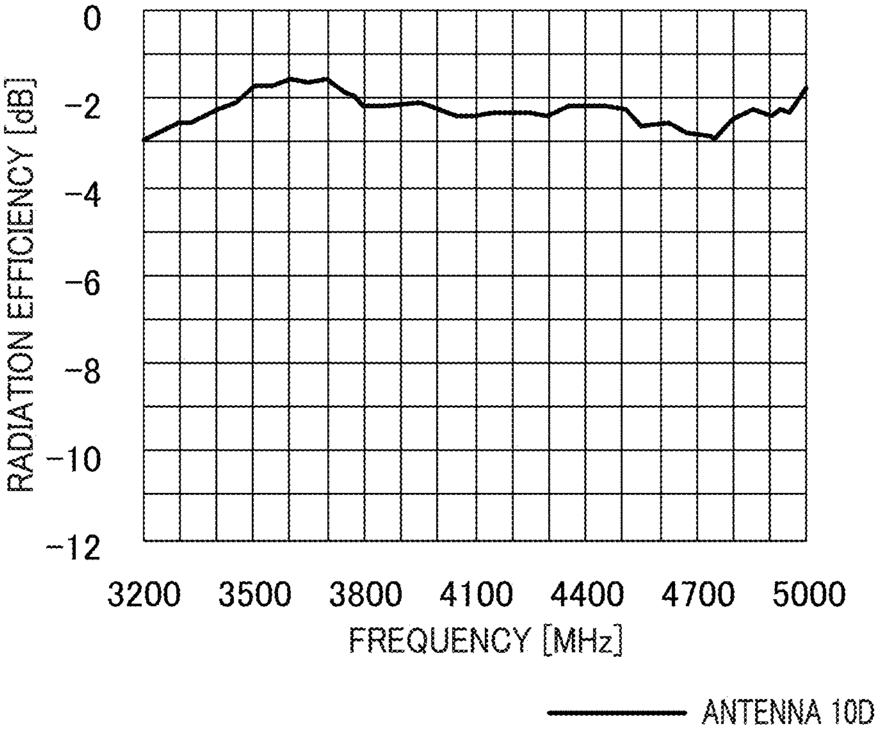

FIGS. 19A and 19B are graphs illustrating frequency characteristic examples of the antenna 10D of the second embodiment in the high-frequency band. FIG. 19A is a graph of VSWR of the antenna 10D in the high-frequency band, and FIG. 19B is a graph of radiation efficiency of the antenna 10D in the high-frequency band.

In FIGS. 17A, 18A, and 19A, the horizontal axis represents frequency, and the vertical axis represents VSWR. In FIGS. 17B, 18B, and 19B, the horizontal axis represents frequency, and the vertical axis represents radiation efficiency. In each of the graphs, the result of the antenna 10D is given by a solid line.

As illustrated in FIG. 17A, the VSWR of the antenna 10D is, for example, equal to or smaller than 3.5, which is a desired value, in the low-frequency band, and it is understood that the characteristics are good. Similarly, as illustrated in FIG. 17B, the radiation efficiency of the antenna 10D is good in the low-frequency band.

Accordingly, from the aforementioned verification results, it is understood that, in the antenna device 1D according to the embodiment of the present disclosure as well, the frequency characteristics are improved in the low-frequency band. As described above, in the antenna device 1D of the embodiment of the present disclosure, the end portions of the first element 11D and second element 21D are positioned so as to be adjacent to each other, thereby being able to be capacitively coupled. This implements the capacitive coupling portion 35, thereby being able to further expand the band corresponding to the low-frequency band supported by the first element 11D toward the lower frequency side, in the antenna device 1D according to the embodiment of the present disclosure.

Although the detailed description is omitted, the characteristics (VSWR and radiation efficiency) of the antenna 10D of the third example of the embodiment of the present disclosure are good in the mid/high frequency band as well, with some exceptions, as illustrated in FIGS. 18A, 18B, 19A, and 19B.

Summary

Hereinabove, the antenna devices 1A to 1D which are embodiments of the present disclosure are described.

The antenna device 1A of the first embodiment includes: the first element 11A; the second element 21A capacitively coupled to the first element 11A; and the base portion 30A coupled to the first and second elements 11A and 21A, as illustrated in FIGS. 1 and 2A to 2C, for example. The first element 11A supports, with the second element 21A, radio waves at least in the low-frequency band (699 to 960 MHz). This makes it possible to implement the antenna device 1A capable of supporting radio waves in a wide frequency band.

The antenna device 1B of the first example of the second embodiment includes: the first element 11B; the second element 21B, which is capacitively coupled to the first element 11B; and the base portion 30B coupled to the first and second elements 11B and 21B, as illustrated in FIG. 9, for example. The first element 11B supports, with the second element 21B, radio waves at least in the low-frequency band (699 to 960 MHz). This makes it possible to implement the antenna device 1B capable of supporting radio waves in a wide frequency band.

The antenna device 1C of the second example of the second embodiment includes: the first element 11C; the second element 21C capacitively coupled to the first element 11C; and the base portion 30C coupled to the first and second elements 11C and 21C, as illustrated in FIGS. 10 and 11A to 11C, for example. The first element 11C supports, with the second element 21C, radio waves at least in the low-frequency band (699 to 960 MHz). This makes it possible to implement the antenna device 1C capable of supporting radio waves in a wide frequency band.

The antenna device 1C of the third example of the second embodiment includes: the first element 11D; the second element 21D capacitively coupled to the first element 11D; and the base portion 30D coupled to the first and second elements 11D and 21D, as illustrated in FIGS. 16A and 16B, for example. The first element 11D supports, with the second element 21D, radio waves at least in the low-frequency band (699 to 960 MHz). This makes it possible to implement the antenna device 1D capable of supporting radio waves in a wide frequency band.

Herein, the low-frequency band (699 to 960 MHz) corresponds to a "first frequency band".

In the antenna device 1A of the first embodiment, the second element 21A supports radio waves in a frequency band (e.g., the frequency band of 1710 to 5000 MHz for Sub-6 GHz) different from the low-frequency band (e.g., 699 to 960 MHz) as illustrated in FIGS. 1 and 2A to 2C, for example. This makes it possible to implement the antenna device 1A capable of supporting radio waves in a wide frequency band.

In the antenna device 1A of the first embodiment, the base portion 30A includes the first region 31 coupled to a feed line, and the second region 32 coupled to the second element 21A, and the antenna device 1A includes the filter 40 configured to attenuate signals in the low-frequency band (699 to 960 MHz) provided between the first and second regions 31 and 32, as illustrated in FIG. 4, for example. This makes it possible to improve isolation between the antenna (the antenna 10A herein) including the first element 11A and the antenna (the antenna 20A herein) including the second element 21A.

In the antenna device 1B of the first example of the second embodiment, the second element 21B is a parasitic element, as illustrated in FIG. 9, for example. This enables the first element 11B of the antenna 10B and the second element 21B, which is a parasitic element, to generate two resonances, thereby being able to implement the antenna device 1B capable of supporting radio waves in a wide frequency band.

In the antenna device 1C of the second example of the second embodiment, the second element 21C is a parasitic element as illustrated in FIGS. 10 and 11A to 11C, for example. This enables the first element 11C of the antenna 10C and the second element 21C, which is a parasitic element, to thereby generate two resonances, thereby being able to implement the antenna device 1C capable of supporting radio waves in a wide frequency band.

In the antenna device 1D of the third example of the second embodiment, the second element 21D is a parasitic element, as illustrated in FIGS. 16A and 16B, for example. This enables the first element 11D of the antenna 10D and the second element 21D, which is a parasitic element, to generate two resonances, thereby being able to implement the antenna device 1D capable of supporting radio waves in a wide frequency band.

In the antenna device 1C of the second example of the second embodiment, as illustrated in FIG. 12B, for example, the base portion 30C includes the third region 33 coupled to the ground portion 3, and the fourth region 34 coupled to the second element 21C, and the antenna device 1C includes the circuit element 50 coupling the third region 33 and the fourth region 34. This makes it possible to improve the characteristics of the antenna (the antenna 10C herein) included in the antenna device 1C, in the low-frequency band (699 to 960 MHz).

The antenna device 1B of the first example of the second embodiment may similarly include the circuit element 50 although not illustrated. This makes it possible to improve the characteristics of the antenna (the antenna 10B herein) included in the antenna device 1B, in the low-frequency band (699 to 960 MHz).

The antenna device 1D of the third example of the second embodiment may similarly include the circuit element 50 although not illustrated. This makes it possible to improve the characteristics of the antenna (the antenna 10D herein) included in the antenna device 1D, in the low-frequency band (699 to 960 MHz).

In the antenna device 1C of the second example of the second embodiment, the circuit element 50 is a resistor to terminate signals in the first frequency band, as illustrated in FIG. 12B, for example. The circuit element 50 may be an attenuator instead of the resistor. This makes it possible to improve the characteristics of the antenna (the antenna 10C herein) included in the antenna device 1C, in the low-frequency band (699 to 960 MHz).

In the antenna device 1B of the first example of the second embodiment as well, the circuit element 50 may similarly be a resistor although not illustrated. This makes it possible to improve the characteristics of the antenna (the antenna 10B herein) included in the antenna device 1B, in the low-frequency band (699 to 960 MHz).

In the antenna device 1D of the third example of the second embodiment as well, the circuit element 50 may similarly be a resistor although not illustrated. This makes it possible to improve the characteristics of the antenna (the antenna 10D herein) included in the antenna device 1D, in the low-frequency band (699 to 960 MHz).

As illustrated in FIGS. 10, 11A to 11C, and 12A, for example, the antenna device 1C of the second example of the second embodiment includes the ground portion 3, and the first element 11C includes: the standing portion 12C formed so as to stand against the ground portion 3; and the extending portion 13C formed so as to extend from the standing portion 12C and face the ground portion 3. In the top view illustrated in FIG. 11A, the standing portion 12C is spaced apart from the base portion 30C. In the side view illustrated in FIG. 11B, the base portion 30C is positioned between the extending portion 13C and the ground portion 3, and the standing portion 12C extends to the ground portion 3 side relative to the base portion 30C. This makes it possible to improve the characteristics of the antenna (the antenna 10C herein) included in the antenna device 1C, in the low-frequency band (699 to 960 MHz).

As illustrated in FIGS. 16A and 16B, for example, the antenna device 1D of the third example of the second embodiment includes the ground portion 3, and the first element 11D includes: the standing portion 12D formed so as to stand against the ground portion 3; and the extending portion 13D formed so as to extend from the standing portion 12D and face the ground portion 3. The standing portion 12D is spaced apart from the base portion 30D. The base portion 30D is positioned between the extending portion 13D and the ground portion 3, and the standing portion 12D extends to the ground portion 3 side relative to the base portion 30D. This makes it possible to improve the characteristics of the antenna (the antenna 10D herein) included in the antenna device 1D, in the low-frequency band (699 to 960 MHz).

In the antenna device 1C of the second example of the second embodiment, the standing portion 12C and the ground portion 3 are not electrically connected, as illustrated in FIG. 12A, for example. This makes it possible to improve the characteristics of the antenna (the antenna 10C herein) included in the antenna device 1C, in the low-frequency band (699 to 960 MHz).

In the antenna device 1D of the third example of the second embodiment, the standing portion 12D and the ground portion 3 are not electrically connected, as illustrated in FIGS. 16A and 16B, for example. This makes it possible to improve the characteristics of the antenna (the antenna 10D herein) included in the antenna device 1D, in the low-frequency band (699 to 960 MHz).

In the antenna device 1C of the second example of the second embodiment, as illustrated in FIGS. 10 and 11A to 11C, for example, the extending portion 13C includes: the main portion 14C extending from the standing portion 12C; the first additional portion 15C extending from the main portion 14C, the first additional portion 15C being positioned away from the standing portion 12C; and the second additional portion 16C extending from the main portion 14C, the second additional portion 15C being positioned close to the standing portion 12C. This enables the antenna (the antenna 10C herein) included in the antenna device 1C to support radio waves in a frequency band other than the low-frequency band (699 to 960 MHz).

In the antenna device 1D of the third example of the second embodiment, as illustrated in FIGS. 16A and 16B, for example, the extending portion 13D includes: the main portion 14D extending from the standing portion 12D; the first additional portion 15D extending from the main portion 14D, the first additional portion 15D being positioned away from the standing portion 12D; and the second additional portion 16D extending from the main portion 14D, the second additional portion 16D being positioned close to the standing portion 12D. This enables the antenna (the antenna 10D herein) included in the antenna device 1D to support radio waves in a frequency band other than the low-frequency band (699 to 960 MHz).

In the antenna device 1C of the second example of the second embodiment, as illustrated in FIGS. 10 and 11A to 11C, for example, the first element 11C includes the short-circuit portion 17C coupled to the ground portion 3. The second element 21C, the standing portion 12C, the main portion 14C, the first additional portion 15C, and the short-circuit portion 17C mainly support the low-frequency band (699 to 960 MHz). The standing portion 12C, the main portion 14C, the second additional portion 16C, and the short-circuit portion 17C mainly support the mid-frequency band (1710 to 2690 MHz) whose frequencies are higher than the low-frequency band. The standing portion 12C mainly supports a frequency band (e.g., the high-frequency band, 3300 to 5000 MHz) whose frequencies are higher than the mid-frequency band. This enables the antenna (the antenna 10C herein) included in the antenna device 1C to support radio waves in a frequency band other than the low-frequency band (699 to 960 MHz).

In the antenna device 1D of the third example of the second embodiment as well, the first element 11D may similarly include a short-circuit portion coupled to the ground portion 3, although not illustrated. The second element 21D, the standing portion 12D, the main portion 14D, the first additional portion 15D, and the short-circuit portion may mainly support the low-frequency band (699 to 960 MHz). The standing portion 12D, the main portion 14D, the second additional portion 16D, and the short-circuit portion may mainly support the mid-frequency band (1710 to 2690 MHz) whose frequencies are higher than the low-frequency band. The standing portion 12D may mainly support a frequency band (e.g., the high-frequency band, 3300 to 5000 MHz) whose frequencies are higher than the mid-frequency band. This enables the antenna (the antenna 10D herein) included in the antenna device 1D to support radio waves in a frequency band other than the low-frequency band (699 to 960 MHz).

Herein, the mid-frequency band (1710 to 2690 MHz) corresponds to a "second frequency band".

In the antenna device 1A of the first embodiment, as illustrated in FIGS. 1 and 2A to 2C, for example, the first element 11A includes the short-circuit portion 17A, which is coupled to the ground portion 3. This makes it possible to facilitate impedance matching of an antenna (the antenna 10A herein) included in the antenna device 1A.

In the antenna device 1B of the first example of the second embodiment as well, the first element 11B may similarly include a short-circuit portion coupled to the ground portion 3, although not illustrated, for example. This makes it possible to facilitate impedance matching of an antenna (the antenna 10B herein) included in the antenna device 1B.

In the antenna device 1C of the second example of the second embodiment as well, the first element 11C may similarly include the short-circuit portion 17C coupled to the ground portion 3, as illustrated in FIG. 11C, for example. This makes it possible to facilitate impedance matching of an antenna (the antenna 10C herein) included in the antenna device 1C.

In the antenna device 1D of the third example of the second embodiment as well, the first element 11D may similarly include a short-circuit portion coupled to the ground portion 3, although not illustrated. This makes it possible to facilitate impedance matching of an antenna (the antenna 10D herein) included in the antenna device 1D.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

1A to 1D, 1X ANTENNA DEVICE
2 CASE
3 GROUND PORTION
4 SEAT PORTION
5 FEED LINE COUPLING PORTION
10A TO 10D, 10X, 20A, 20X ANTENNA
11A TO 11D, 11X FIRST ELEMENT
12A TO 12D, 12X STANDING PORTION
13A TO 13D, 13X EXTENDING PORTION
14A TO 14D MAIN PORTION
15A TO 15D FIRST ADDITIONAL PORTION
16A TO 16D SECOND ADDITIONAL PORTION
17A, 17C, 17X SHORT-CIRCUIT PORTION
18, 27 FEED PORTION
19 FIRST ELEMENT COUPLING PORTION
21A TO 21D, 21X SECOND ELEMENT
22 ANTENNA PORTION
23 ADDITIONAL ELEMENT PORTION
24, 28 STANDING PORTION
25, 29 EXTENDING PORTION
26 SECOND ELEMENT COUPLING PORTION
30A TO 30D, 30X BASE PORTION
31 FIRST REGION
32 SECOND REGION
33 THIRD REGION
34 FOURTH REGION
35 CAPACITIVE COUPLING PORTION
40 FILTER
41 HIGH-PASS FILTER (HPF)
42 BAND PASS FILTER (BPF)
43 BAND ELIMINATION FILTER (BEF)
50 CIRCUIT ELEMENT

The invention claimed is:

1. An antenna device, comprising:
a first element;
a second element capacitively coupled to the first element;
a base portion coupled to the first element and the second element; and
a ground portion, wherein
the first element supports, with the second element, radio waves at least in a first frequency band, and
the first element includes:
a standing portion formed so as to stand against the ground portion; and
an extending portion formed so as to extend from the standing portion and face the ground portion,
the standing portion is spaced apart from the base portion, and
in side view, the base portion is positioned between the extending portion and the ground portion, and the standing portion extends to the ground portion side relative to the base portion.

2. The antenna device according to claim 1, wherein the second element supports radio waves in a frequency band different from the first frequency band.

3. The antenna device according to claim 2, further comprising:
a filter configured to attenuate a signal in the first frequency band, wherein
the base portion includes a first region coupled to a feed line and a second region coupled to the second element, and
the filter is provided between the first region and the second region.

4. The antenna device according to claim 1, wherein the second element is a parasitic element.

5. The antenna device according to claim 1, further comprising:
a circuit element, wherein
the base portion includes a third region coupled to the ground portion and a fourth region coupled to the second element, and
the circuit element couples the third region and the fourth region.

6. The antenna device according to claim 5, wherein the circuit element terminates a signal in the first frequency band.

7. The antenna device according to claim 1, wherein the standing portion and the ground portion are not electrically connected.

8. The antenna device according to claim 1, wherein
the extending portion includes:
a main portion extending from the standing portion;
a first additional portion extending from the main portion, the first additional portion being positioned away from the standing portion; and
a second additional portion extending from the main portion, the second additional portion being positioned close to the standing portion.

9. The antenna device according to claim 8, wherein
the first element includes a short-circuit portion coupled to the ground portion,
the second element, the standing portion, the main portion, the first additional portion, and the short-circuit portion support the first frequency band,
the standing portion, the main portion, the second additional portion, and the short-circuit portion support a second frequency band whose frequencies are higher than frequencies of the first frequency band, and
the standing portion supports a frequency band whose frequencies are higher than frequencies of the second frequency band.

10. The antenna device according to claim 1, wherein the first element includes a short-circuit portion coupled to the ground portion.

11. An antenna device, comprising:
a first element formed of a metal plate;
a second element formed of a metal plate and capacitively coupled to the first element;
a base portion coupled to the first element and the second element; and
a ground portion coupled to the first element,
wherein the first element supports, with the second element, radio waves at least in a first frequency band
the first element includes:
a standing portion formed so as to stand against the ground portion;
an extending portion formed so as to extend from the standing portion and face the ground portion; and
a short-circuit portion coupled to the ground portion,
the extending portion includes:
a main portion extending from the standing portion;

a first additional portion extending from the main portion, the first additional portion being positioned away from the standing portion; and a second additional portion extending from the main portion, the second additional portion being positioned close to the standing portion, the second element, the standing portion, the main portion, the first additional portion, and the short-circuit portion support the first frequency band, the standing portion, the main portion, the second additional portion, and the short-circuit portion support a second frequency band whose frequencies are higher than frequencies of the first frequency band, and the standing portion supports a frequency band whose frequencies are higher than frequencies of the second frequency band.

12. The antenna device according to claim 11, wherein the second element supports radio waves in a frequency band different from the first frequency band.

13. The antenna device according to claim 11, further comprising:

a filter configured to attenuate a signal in the first frequency band, wherein the base portion includes a first region coupled to a feed line and a second region coupled to the second element, and the filter is provided between the first region and the second region.

14. The antenna device according to claim 11, wherein the second element is a parasitic element.

15. The antenna device according to claim 11, further comprising:

a circuit element, wherein the base portion includes a third region coupled to the ground portion and a fourth region coupled to the second element, and the circuit element couples the third region and the fourth region.

16. The antenna device according to claim 15, wherein the circuit element terminates a signal in the first frequency band.

17. The antenna device according to claim 11, wherein the first element includes a short-circuit portion coupled to the ground portion.

* * * * *